United States Patent [19]

Wissner

[11] Patent Number: 5,754,851
[45] Date of Patent: May 19, 1998

[54] METHOD AND APPARATUS FOR REPRESENTING AND EDITING MULTIMEDIA COMPOSITIONS USING RECURSIVELY DEFINED COMPONENTS

[75] Inventor: Michael J. Wissner, Boston, Mass.

[73] Assignee: Avid Technology, Inc., Tewksbury, Mass.

[21] Appl. No.: 471,852

[22] Filed: Jun. 6, 1995

Related U.S. Application Data

[62] Division of Ser. No. 415,091, Mar. 31, 1995, which is a continuation of Ser. No. 236,244, Apr. 21, 1994, abandoned, which is a continuation of Ser. No. 920,260, Jul. 27, 1992, abandoned, which is a continuation-in-part of Ser. No. 867,183, Apr. 10, 1992, abandoned.

[51] Int. Cl.$^6$ .................................................. G06F 17/30
[52] U.S. Cl. ........................ 395/615; 395/614; 345/302
[58] Field of Search ....................... 395/153–155, 395/160, 161, 614, 615, 774, 806, 807; 360/13, 14.1–14.3; 345/302

[56] References Cited

U.S. PATENT DOCUMENTS 5,568,275  10/1996  Norton et al. ............................. 386/52

OTHER PUBLICATIONS

Stotts et al., "Temporal Hyperprogramming", J. of Visual Languages and Computing, v. 1, pp. 237–253, Jan. 1990.
Little et al., "Multimedia Object Models for Synchronization and Databases", Sixth Int' Conf. on Data Engineering, pp. 20–27, Feb. 1990.
Lubich, "A Proposed Extension of the ODA Document Model for the Processing of Multimedia Documents", Proc. of TRICOMM '91, IEEE Conf. on Comm. Software, pp. 59–72, Apr. 1991.

Hoepner, "Synchronizing the Presentation of Multimedia Objects—ODA Extensions", Eurographics Multimedia Workshop, Apr. 1991.
Newcomb et al., "HyTime': The Hypermedia/Time–based Document Structuring Language", Comm. of the ACM, v. 34, n. 11, pp. 67–83, Nov. 1991.
Herrtwich et al., "ODA–Based Data Modeling in Multimedia Systems", International Computer Science Institute, TR–90–043, pp. 1–15, Aug. 1990.
Poggio et al., "CCWS: A Computer–based Multimedia Information System", Computer, Oct. 1985, pp. 92–103.
Yoneda et al., "A New Communication Tool: Time Dependent Multimedia Document", 12$^{th}$ Int'l Conf. on Distributed Computing Systems, Jun. 9, 1992, pp. 90–97.

Primary Examiner—Joseph R. Burwell
Attorney, Agent, or Firm—Wolf, Greenfield & Sacks, P.C.

[57] ABSTRACT

A system for editing and representing multimedia compositions in which the representation of a composition enables a composition to be an arbitrarily deep nesting of assemblies of components. In this representation, relationships between synchronous components may be represented, by an array or list. Components which are related sequentially in time are represented by a sequence component, which may be implemented as a tree. For the purpose of improving searching within the tree, a sequence component is implemented as a balanced binary, or 2–3–tree. By using such a representation, searching for a component based on its position in time in the sequence may be performed in logarithmic rather than linear time. Each node in the tree has a corresponding duration, which represents the sum of the durations of any subnodes. Media data for a composition is excluded from the representational structures and is merely referred to by such structures. Thus, compositions may be stored separately from the media data.

8 Claims, 38 Drawing Sheets

METHOD AND APPARATUS FOR REPRESENTING AND EDITING MULTIMEDIA COMPOSITIONS USING RECURSIVELY DEFINED COMPONENTS

This application is a division of application Ser. No. 08/415,091, filed on Mar. 31, 1995, pending, which is a file-wrapper continuation application of U.S. application Ser. No. 08/236,244, filed Apr. 21, 1994, abandoned, which is a file-wrapper continuation application of U.S. application Ser. No. 07/920,260, filed Jul. 27, 1992, abandoned, entitled METHOD AND APPARATUS FOR REPRESENTING AND EDITING MULTIMEDIA COMPOSITIONS, which is a continuation-in-part of application Ser. No. 07/867,133, filed Apr. 10, 1992, abandoned, entitled COMPUTER SYSTEM FOR VIDEO EDITING AND POST-PRODUCTION.

FIELD OF THE INVENTION

This invention is related to methods and apparatus for editing and representing multimedia compositions. More particularly, the invention is related to video and audio editing systems for creating video programs, and for representing such video programs.

BACKGROUND OF THE INVENTION

Known representations of relationships of video and audio information that comprise a video program are very limited. Edit decision lists (EDL) have been used throughout the video industry. An EDL consists of a sequence of event descriptions, where each event is a transfer of a program segment from a source tape to a master tape. There are a number of available EDL formats, but each format conveys similar information. The event description contains such information as the source of a new program segment, time codes describing both a desired portion of the source and its destination in the final program, and the type of edited transition that is to be used from any previous segment. From this information, the final program is constructed from the several sources of program material. EDL systems are limited in their representational capability and content, and are inflexible. Further, because an EDL is limited in its content, and since there are many different EDL formats, different EDL systems are often incompatible. That is, a video program developed using one EDL format may not be usable by another EDL-based product.

More recently, developments have been made in the field of computerized multi-media editing systems. Many of these systems use a subsystem, called QuickTime, made by Apple Computer, of Cupertino, Calif. All of these systems, however, provide a "flat" representation of a multimedia composition. That is, the representation is merely linear with time. In order to access a location in a composition, a linear search is required.

Further, such systems usually have a bare minimum of recordkeeping by not keeping track of editing steps made to generate the composition. A final copy of a composition is generated with these systems, and there is no record kept of the layering of media in a frame of the composition. Without this information, many steps may need to be performed if an edit is changed.

For example, when editing, analog sources are run in parallel in accordance with the editing steps and the resulting composition is recorded on a master tape. Similar steps are used when editing with information in digital form as well. In prior systems, the composition rules and steps are not saved, and thus when an editor wants to change something in the final copy, the whole master tape has to be re-recorded to obtain the new composition. Such editing steps are wasteful of time and materials.

Accordingly, it is a general aim of the present invention to provide a method and apparatus for representing and editing multimedia compositions which separates the structure of a composition from the media which it uses.

Further, the present invention was developed to maintain a representation of a composition from which layering of and relationships between media in the composition may be determined.

SUMMARY OF THE INVENTION

The foregoing and other objects of the invention are obtained by a system for editing and representing multimedia compositions in which different types of relationships between media are represented by different types of components, and in which components may also represent relationships between different components. A composition utilizing this representation has a hierarchical, tree-like structure.

In this representation, relationships between synchronous components may be represented, for example, by an array or list, which can be envisioned as a tree with one root node and a number of leaves corresponding to the length of the array.

Components which are related sequentially in time are represented by a sequence component, which may be implemented as a tree. Although this tree may be considered as a single level with a number of leaves equal to the number of components in the sequence, it is preferable, for the purpose of searching the tree to implement a sequence component as a balanced binary, or 2–3-tree. By using such a representation, searching for a component based on its position in time in the sequence may be performed in logarithmic, O(logn), rather than linear, O(n), time. In a preferred embodiment, each node in the tree has a corresponding duration, which represents the sum of the durations of any subnodes.

Such a representation of sequential and synchronous components embodies the idea that a composition is not just a linear assembly of media, but an assembly of assemblies. Thus, a composition may be an arbitrarily deep, hierarchical structure.

Media data for a composition is excluded from the representational structures and is merely referred to by such structures. Thus, compositions may be stored separately from the media data.

A system in accordance with the invention may also provide operations on components which allow editing, through creation, modification and deletion of components. Using these operations in conjunction with a computer system, an editor of multimedia compositions can perform such functions as replacing, overwriting, inserting, extracting and lifting components in a composition.

Multimedia data manipulated by the system of the invention may be media data files on a hard disk on a computer system. These media files are preferably created from original media sources, for example, through video compression or from analog audio sources. References to media data files in a composition also include an indication of the original source material, if any, which enables computer based digital media to be used while constructing a composition, while enabling original source material to be used when making a final production of the composition. The media data are not part of the composition; the composition only refers to the media.

Compositions created with this editing and representation system may be used by other systems to create edit decision lists, to play the composition, to eliminate unnecessary data files, etc. Other advantages and applications of the present invention should become apparent to those of skill in this art after a reading of the following description which should be read in conjunction with the attached drawing.

DETAILED DESCRIPTION

The following is a detailed description of an embodiment of the present invention. The method and apparatus described below may be used to edit and represent multimedia compositions. A multimedia composition is a collection of relationships between time-varying media data, representing how the data should be synchronized and combined over time. Time-varying data may be, for example, video or audio data, but is not limited to such data. Time-invarying data is a subcategory of time-varying data and thus still pictures and text also may be manipulated using this invention. The data are related by grouping them into different types of components, the combination of which forms a composition.

Figure 1:
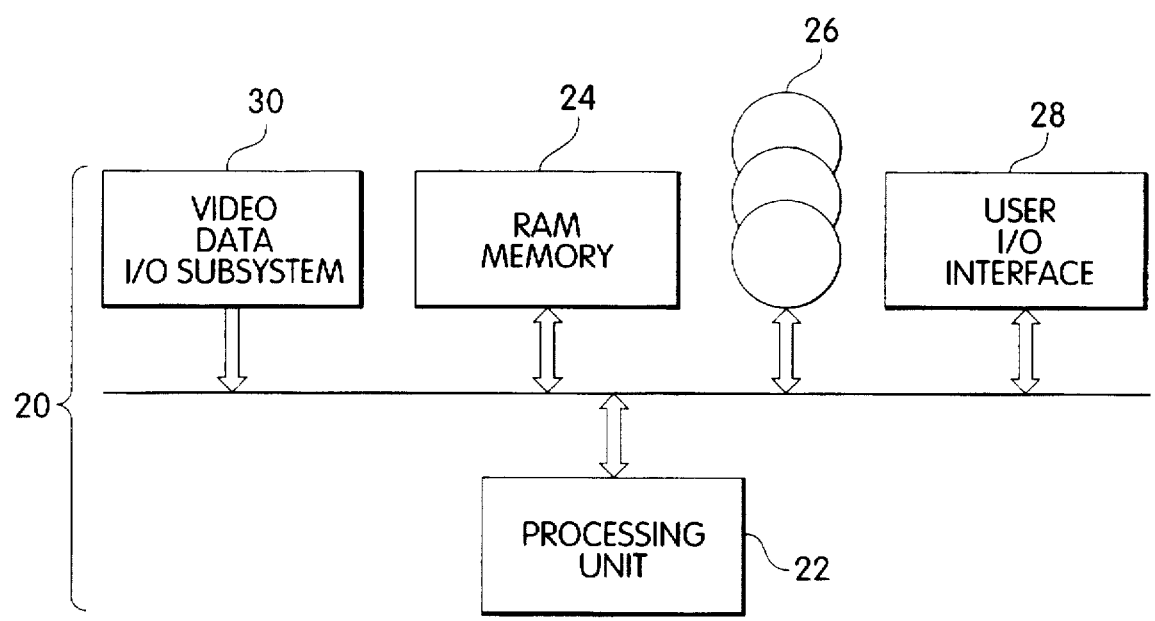
FIG. 1 is a block diagram describing a computer system suitable for implementing the present invention.

FIG. 1 is an illustration of a typical computer system 20 with which the present invention may be implemented. It should be understood that the invention is not limited by the specific computer system shown and described herein. Many other different machines may be used to implement the invention.

Such a suitable computer system 20 includes a processing unit 22 which performs a variety of functions, in a manner well known in the art, in response to instructions provided from an application program. The processing unit functions according to a program known as the operating system, of which many types are known in the art. The steps of an application program are typically provided in random access memory (RAM) 24 in machine-readable form. Because RAM 24 is typically a volatile memory, application programs are typically stored on a non-volatile memory 26, such as a hard disk or floppy disk. When a user selects an application program, it is loaded from the hard disk 26 to the RAM 24, and the processing unit 22 proceeds through the sequence of instructions of the application program.

The computer system 20 also includes a user input/output (I/O) interface 28. The user interface typically includes a display apparatus (not shown), such as a cathode-ray-tube (CRT) display and an input device (not shown), such as a keyboard or mouse. A variety of other known input and output devices may also be used, such as speech generation and recognition units, audio output devices, etc. For the purposes of the invention, the inventors currently use a CRT display with 640 by 480 pixel resolution, a keyboard and a mouse. An audio output device is also provided.

The computer system 20 also includes a video and audio data I/O subsystem 30. Such a subsystem is well known in the art and the present invention is not limited to the specific subsystem described herein. The audio portion of subsystem 30 includes an analog-to-digital (A/D) converter (not shown) which receives analog audio information and converts it to digital information. The digital information may be compressed using known compression systems, for storage on a hard disk 26 enabling it to be used at another time. A typical video portion of subsystem 30 includes a video image compressor/decompressor (not shown) of which many are known in the art. Such compressors/decompressors convert analog video information into compressed digital information. The compressed digital video information may be stored on hard disk 26 for use at a later time. An example of such a compressor/decompressor is known as JPEG III which is described in detail in U.S. patent application entitled "Improved Media Composer" filed Apr. 10, 1992 now U.S. Pat. No. 5,355,450.

The computer system 20, as shown in FIG. 1, may be implemented using a number of available commercial computer systems. The present invention is not limited by the specific systems or computer languages shown and described. At the present time, the inventors use a Macintosh IIfx, available from Apple Computer, of Cupertino, Calif., and an Indigo computer manufactured by Silicon Graphics, Inc. of Mountain View, Calif. The computer system 20 may be programmed using any of many known computer languages, in a manner with which those skilled in the art are familiar, to obtain and apparatus and to practice the method described herein. The computer programming language used on the Indigo was C++; on the Macintosh ThinkC 5.0 available from Symantec, Corp. may be used. Other suitable languages are preferably object-oriented languages. The system may also be implemented in conjunction with an object-oriented database system.

Using such a computer system 20, a user, such as a video editor, may create, edit and modify multimedia compositions, in a manner to be described below, using a variety of media data.

Media data used in a composition may include original source material such as video or audio tape, compact disk, computer generated images, etc. Currently available digital representations of original sources are referred to herein as media data files.

Media data files contain digital data samples which correspond to original source material, as well as information regarding how the media data was created, and an identification of the corresponding original source material. Thus, a media data file may contain a source content identifier, identifying the original source material. A media data file may also include its sample rate, (and therefore the duration of a sample), and the length of each sample in bytes. It also includes an indication of the section of the original source that it represents. It stores the time offset from the source origin of its first sample. The units of this offset is the sample duration for the media data file.

In addition to the creation and playback information, a media data file may include fields containing information regarding the content of the media (e.g., "Girl in room"), the quality of the media (due to compression), or other information.

Multiple representations of the same source material may also be stored if desired. This allows a composition to support the interchange of media at different levels of visual or audio quality for different purposes. For example, one media data file might have a level of quality which is suitable for output to videotape, while an alternative element might be useful for displaying in a small window on a computer screen.

A media data file may also be a representative frame of a video or animation, or a simplified version of a graphic, or a "sound bite" from an audio source. In such cases, the function of such a media data file is to allow a composition to approximate the actual source without having to use too much disk space for storing the file.

Media data files for video may be obtained by compression, such as by using JPEG III, or may be in other formats. The simplest, lossless compressed data format for digital video is Run Length Encoded (RLE) RGBA data format. RLE has a simple to implement algorithm for reading/writing and compression/decompression.

A second suitable compressed video format is based on the JPEG File Interchange Format (JFIF) standard. JPEG compression results in high compression (sometimes 50:1 and higher) of the input data, with minimal degradation in the appearance of the decompressed frame. This format is useful because of its high compression/high quality characteristic, and because public-domain software implementations of JFIF readers/writers and compressor/decompressors are available.

A suitable graphics format is an RLE Pixel array, encoded as described above, but for a single frame. Graphics may also be provided in the TIFF format, (a trademark of the Aldus Corporation) which is another format based on EA IFF, and allows for great flexibility in the specification of graphic data.

A suitable format for audio data is AIFF (Audio Interchange File Format). The widely-used AIFF format is based on the EA IFF 85 standard. It specifies parameters such as sample size, number of channels (i.e. interleaving) and sample rate, and provides a wrapper for the raw audio data. The AIFF format is not a compressed audio format and so there is no loss of data in translating to/from AIFF form. The Sound Designer II format is also an example of a suitable format.

For text files, such as commentary, file names, and other text, a media data file may encode text formation in ASCII format or other character encoding.

In order to support the editing of compositions of such a variety of media, the method and apparatus of the present invention includes data structures for organizing and storing information concerning a composition and operations for manipulating those data structures. These data structures and operations will now be described in connection with FIGS. 2 through 30.

DATA STRUCTURES

The basic building blocks of a composition are called components. A composition is structured as a tree of components; it has a root component and a component may or may not have some subcomponents, depending on its type. A component is a function over time since it contains information for producing the state of its portion of the composition at any time within its range. A component thus represents a time-dependant sequence of media data or sources called a media stream.

The simplest elements of a composition are source components, or "clips," representing sections of concrete media such as video on a video tape, audio on a compact disk, or a computer-generated image on a computer disk. Other components represent different combinations of media streams which produce new media streams. Such components represent the variety of relationships created by editing operations performed, for example, by video editors and audio mixers.

Components may be categorized and implemented in several ways. It is preferable to use a form of object-oriented programming to enforce a categorization. The above-described computer system 20 may be programmed using an object-oriented programming language, such as C++, to provide definitions of types of components. Such definitions express the commonality between all components which are instances of a type, and enable the enforcement of structural rules for a composition.

In an object-oriented composition editing and representation system, there are two types of hierarchies. The first type of hierarchy is abstract, illustrating how one type of component may be a subtype of another type of component. Such a hierarchy is known as a class hierarchy and will be described below in further detail in connection FIG. 2. The second type of hierarchy is a structural hierarchy, which indicates how a composition is composed hierarchically of instances of abstract components. The structural hierarchy of a composition will be described in further detail below in connection with FIG. 3.

The data structures used for representing a composition exclude media data, by containing only indications of or references to the media data and representations of the relationships between and combinations of the media which form the composition. Thus, compositions are stored separately from the media data to which they refer, and allow many compositions to use the same media data without duplicating it. With such a structure, a composition need not be reproduced when it is changed. Further, the composition itself does not actually produce the presentation but merely represents it and provides information for the presentation.

Figure 2:
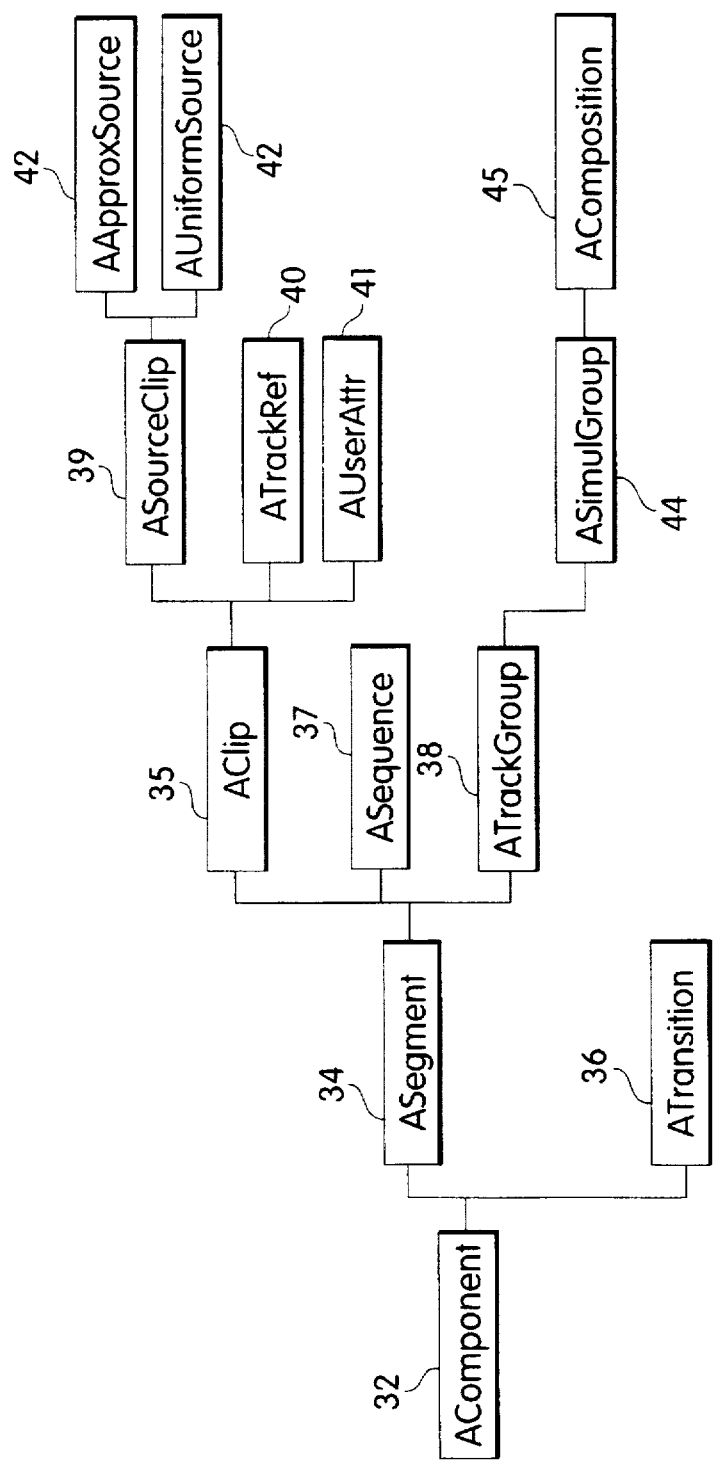
FIG. 2 is a diagram of the class hierarchy of object classes of an embodiment of the invention.

In a preferred embodiment of the invention, there are several classes of components in a composition as reflected in FIG. 2. A class is a category of object such that all objects within that class are similar in representation and functionality. These classes may in some cases be implemented in a computer system using an object-oriented program construct called a class. Some of these classes are abstract classes, of which no components are direct members. Components may, however, be indirect members of an abstract class by virtue of being direct members of a subclass of the abstract class. Because there are no direct members of an abstract class, the purpose of defining an abstract class is to express the commonality of the subclasses of that class. It enables operations to be defined once for one abstract class rather than multiple times—once for each subclass. Classes which are not abstract, and therefore which may have direct members, are called concrete classes.

Specific classes will now be described in connection with FIG. 2. It should be understood that other and/or more classes may be implemented, and that the invention is not limited to or by the specific classes shown.

Component

The top level, abstract, class of a composition is called a component (32 in FIG. 2), and defines the functionality common to all components. For each component created for a composition, memory locations are allocated to store and group together relevant information concerning that component. A component which is a member of a subclass of the component class inherits the characteristics of the component class. The information stored as a part of each component, and to be described in more detail below is the following:

1) Track type
2) Player function code
3) Edit rate
4) Parent
5) Subcomponent identifier
6) Edit nesting level
7) Precompute
8) Name
9) Attribute list The track type (1) is an indication of the type of material, or media data, represented by the component, such as video, audio, etc. The player function code (2) is used to indicate the algorithm for displaying the material represented by the component.

A component also includes an edit rate (3) which is a representation of the time units used for determining the duration of the component. The edit rate is different from the actual sample durations stored in the media data, and can be thought of as a "virtual" sample rate. An edit rate is a number of edit units per second and is not limited to being an integer. For example, it could be a floating point decimal. The edit rate thus defines the duration of virtual samples within a component. It also determines the smallest editable unit of media. For example, a frame based 30 fps NTSC video editor may use an edit unit of 29.97 for its video components. An audio editor for editing audio associated with the video may use the same edit rate of 29.97. Thus, media data can be substituted at a later time with media digitized at a different sample rate, and the composition will still be valid since there is enough information maintained to perform a sample rate conversion. (Sample rate conversion capabilities are well known in the art.)

A component also contains a reference to the component which depends on it in the composition, a parent pointer (4). It also contains a subcomponent identifier (5) which identifies the component in its parent's context. Since a composition is hierarchical, every component, except the root component, has a parent component. By maintaining parent pointers it is possible, when a composition is edited, to find the dependencies on a particular component, enabling the composition manager, for example, readily to locate components affected by the change.

A component may also contain an optional pointer 7, another component representing a precomputed media data file. A precomputed media data file is one which contains a concrete representation of the intermediate media stream produced by the component it is attached to. This feature enables an application to play a composition in real time, when it would not be possible to compute in real time the media effects represented by the composition. Further, it enables an editor either to see the pre-computed result, or to re-make the effect from the original source material.

The edit nesting level (6) is used for identifying nested editing steps on a component. Its use will be described in more detail below in connection with the description of editing operations.

The name (8) and attribute list (9) of a component are examples of optional information to assist in identifying the contents of a component, such as "girl in room".

With such information, a component need not maintain any explicit indication of its location in time in a composition. This location may be computed by following the parent pointer links to the root of the composition, and, at each level, passing the subcomponent identifier to the parent. The parent then computes the offset of the subcomponent within its own context and adds it to an accumulating offset. By not storing this information explicitly, the number of components which need to be examined when an edit occurs may be limited, thus maintaining high efficiency of editing.

Segment 34 and transition 36 (FIG. 2) are two subclasses of the component class which therefore inherit the information stored in a component.

Transition

Transitions, a concrete class of objects, are components which are located between two segments (defined below) in a sequence of components (a sequence will be defined in more detail below), and indicate how a presentation should transition from displaying the first segment to displaying the second. Transitions act as 'glue' between two segments and implicitly represent a combination of those segments. Thus, transitions are not independent. A transition further includes the following information:

1) Transition code
2) Left effect length
3) Right effect length

The left effect length (2) and the right effect length (3) indicate the extent, in absolute value, of the transition effect, referenced to an imaginary cut point between the two surrounding segments. The imaginary cut point is the point in time where the left adjacent segment would meet the right adjacent segment if the transition component were not present. The left effect length indicates at what time the transition starts relative to the cut point. The right effect length indicates at what time the transition effect ends relative to the cut point. The duration of a transition is determined by the sum of its left and right effect lengths.

A transition also has a transition code (1) indicating the type of transition to be invoked when playing the composition. Transition types and their corresponding algorithms are well known in the art and the invention is not limited to or by the types mentioned herein.

A transition may be as simple as a quick cut from one Segment to the next (where the left and right effect lengths are zero) or something more complicated such as a "dissolve", or "wipe" from the incoming segment to the outgoing segment. A transition, as may any other component, may have a precomputed representation of the transition effect. Other than this precompute attribute, inherited from the component class, transitions normally do not refer to media. They may be thought of as a function of segments which precede and follow them in a sequence.

Segment

A segment is an abstract class of component which represents an independent description of a section of a presentation. It is independent because it provides a meaningful representation of a piece of a composition even when viewed out of the context of the rest of the composition in contrast to transitions which depend on neighboring components. A segment may be a simple clip (representing some kind of media), or it may be a more complex structure such as a sequence, or track group (all to be defined in more detail below). It is also the representation for a track. A segment inherits its functionality from the component class. As an example of inheritance, a segment may also contain a precompute attribute, which if supplied, provides access to a computed and stored representation of that segment.

There are three subclasses of the segment class: clip 35, sequence 37 and track group 38.

Sequence

A sequence, a concrete subclass of a segment, represents the serialization or concatenation in time of some other subcomponents. A sequence, as its name implies, is an ordered list of segments separated by transitions, with the restriction that it begins and ends with a segment. This restriction allows sequences to be treated as segments, which may be included in other sequences.

The order of segments in a sequence defines their order of interpretation (or, "playback"). Thus, sequencing information is represented implicitly by the structure of the sequence, rather than explicitly through the use of relative start times and durations for clips. It may include the following information:

1) ordered collection of subcomponents
   a) length of subcomponent in edit units
   b) subcomponent identifier (pointer)

A sequence of media data is represented in the form of a tree of its subcomponents rather than linearly. Preferably, a modification of a balanced binary tree data structure (a modified 2–3-tree) is used. Although the binary tree has been in use for some time, its application and modification to represent sequences of media is novel. The 2–3-tree is a tree in which each node may have either two or three subnodes. The 2–3-tree is kept balanced using well-known procedures. The modification used in the present invention relates to how a subcomponent of the sequence is found using the tree. Each node is assigned a value, or key, indicative of the total duration of any subcomponents. The keys are kept as part of the data structure of the sequence and not its subcomponent. When a position in a sequence is searched for, the keys are examined to limit the extent of the search. Insertion procedures commonly used in b-trees are not used here, as the insertion of a segment within a sequence is arbitrary, based on an editor's commands.

Clip

A clip is an abstract class of component that represents a single contiguous section of a piece of media, with a specified position in the media and a specified length. A clip further contains information on its length, which explicitly determines its duration. The position of a clip in the target media may be explicit or implicit depending on its subclass.

There are three concrete subclasses of clips: source clips 39, track references 40, and user attributes 41.

Source Clip

Compositions can represent arbitrarily complex manipulations of media, but ultimately they are all based on physical sources, such as a video tape from a camera, or a graphic produced by a computer program. References to source material are embodied in source clips 39 which describe a single time-contiguous section of a source, by denoting a position in the source, and a length.

A source clip does not contain the actual media but only references it. Source clips represent the lowest level, or leaf components, of a composition. A source clip inherits the properties and functions of a clip, but also contains the following information:

1) Physical rate
2) Physical start
3) Physical length
4) Source identifier
5) Source offset
6) Currently linked media file The source identifier (4) identifies a specific portion of an original source. A source offset (5) identifies a starting position within the source. The selected media digitization of that source or the currently linked media data file (6) is represented, for example, by a pointer or file name.

To be independent of data type and sample rate, source references such as the source offset are measured in abstract units called edit units (EUs). An EU is a unit of duration, representing the smallest interval of time which is recognized by a given part of a composition, and the number of EUs per second is called the edit rate. The edit rate for a particular component (as mentioned above) is chosen by an editor to represent something useful in the application domain. For example, an application which edits audio based on video frame boundaries would most likely choose an edit rate of 29.97 for the audio tracks, whereas an application which creates audio for use on compact discs would most likely use an edit rate of 44100. Another way of thinking of edit rate is as a 'virtual' sample rate. This rate may or may not match the actual sample rate of the digital media.

The length of a source clip is measured in edit units, and the target position in the source is denoted in edit units from a point on the source called the source origin. The origin is an arbitrary place in the source which serves as a reference point for many measurements.

Using independent edit units for a composition may be modified to refer to newly acquired media which represents the same original sources. For example, an editor may use highly compressed, low quality video data to perform video editing, but then use high-quality video data to assemble the final multi-media composition. The composition can be automatically linked to the high-quality media data with little effort.

Further, a source clip uses position in the original source (source offset) as a reference, not the position in the currently accessible media data. Thus, new media data which represents a different subset of the source material may be linked to the composition sometime after editing, and the composition has enough information to relocate itself within the new media data. When the media data is accessed from the media data file, the start, length and edit rate of each source clip may be used to corresponding samples from the media data file by converting EU's to sample durations, subtracting the offset of the media data from its source origin, and converting the resulting sample time offset to a sample byte offset.

Information concerning the media data file may optionally be stored in the source clip as well. This information includes the sample rate, number of samples and start sample number corresponding to the desired source material. This material is useful for keeping a record of the media data file used, in case that file becomes deleted and retrieval of a similar data file is desired.

Some source clips do not refer to physical media data; the data is computed on the fly. These are referred to as virtual sources, or computed sources. These clips may be used to represent media information that is derived functionally, or that simulates some behavior. Much of the control data of a composition, such as volume settings and equalization information for audio may be represented in this fashion. For example, the control data used to "ramp up" an audio signal over a 30 frame period could be represented by a virtual source.

There are special types or subclasses of source clips which represent some special cases of media: uniform source clips 42 and approximate source clips 43.

A uniform source clip may be used to represent media that is invariant over time, such as silent audio, a "Please Stand By" graphic, or black filler video frames, that is to be displayed for a period of time. By specifying such media as uniform source clips, some special editing behavior may be applied to those sources. For example, transitions between two uniform sources may be automatically removed and replace with one clip equal in length to the sum of the two original clips.

An approximate source clip represents media whose time base is only approximate with respect to the other media in a composition. An example of an approximate source would be scripting information that is to be displayed along with a video/audio scene. The time in the scene is not proportional to the position in the script, but merely are roughly correlated. The text may be displayed a page at a time at the approximate time that the actors are performing the scene, although the timing may not be exact.

Track Reference

A track reference is a concrete subclass of a clip. It represents a contiguous section of media extracted from another track somewhere within the same composition. The target offset into the other track is computed relative to the position of the track reference component in the composition. The specific track referenced by a track reference is defined by a track number and a scope number.

The scope number identifies a particular enclosing scope (as defined by track group components, described below), relative to the track reference itself. A specific scope is found by traveling up the composition structure towards the root using the parent and subcomponent identifier links, and counting each scope encountered. When the counted scopes equals the scope number, the reference scope has been located.

The track number identifies a specific track within that scope according to the subcomponent list of the track group.

Other implementations may identify scopes differently, for example, by searching for a specific labelled scope, labelled with a number or string. Other implementations may also identify tracks differently; for example, by searching for a specific label, or by using a relative track number, which is added to the referencing tracks own track number within the scope.

As will be described below, a track group defines a scope, and defines tracks, and a track reference identifies a referenced track by identifying a scope and a track within the scope. The track reference object creates a kind of relative link, which has a very useful property: an assembly of components containing track references may be copied or removed from an enclosing component, and then reinserted somewhere else, and still by definition refer to a track in the new context. This feature provides the ability to interchange parts of compositions with ease.

Although effects may be built out of wholly contained subtracks of information, it is frequently useful to create an effect which references a separate parallel track in a composition. One example might be an audio track which contains an effect which is the echo of another audio track. A track reference may be used in the effect instead of an explicit subtrack, to make the effect on the first track refer to the second track. A track reference may be also used more generally for implementing layered effects in a composition. Cut and paste of effects is possible: a portion of a composition may be extracted and inserted at a different place in the composition or in a completely different composition, while retaining the internal structural relationships of the contained elements.

User Attributes

An arbitrary user-defined property which varies over time may also be represented as a segment in a composition. Certain user-defined properties may vary in time, in a manner similar to a media source such as video. A track may be added to a composition such that it represents such a property, and user attribute components can be added to that track, each representing a different value for that attribute.

For example, a property track might be added which represents the property called "Camera Distance". Components may be added to the track representing "Long Shot", "Medium Shot", or "Close up". Another property track, for example, could be called "Esther's scenes", and contain components with the values "True" or "False", the duration of each "True" component indicating a range in the composition which contained the actress named "Esther".

Transitions may be extended to work with attributes. A camera zooming in from a long shot to a close up could be represented by a transition called an Attribute dissolve placed between a long shot clip and a close up clip, or an attribute dissolve between true and false in the "Esther's scenes" track could match a visual effect of the actress fading out of the picture. In the context of editing the composition this transition would behave analogously to other transition components such as video dissolves.

Track Group

A track group 38 is an abstract subclass of a segment, which represent way of combining one or more concurrent streams of media under a function. That is, if there is to be sequencing among a number of tracks of the same or of different base media type, then those tracks are grouped in a track group. Tracks are composed of a single segment, or a sequence of segments separated by transitions. They represent a parallel relationship of subcomponents, as compared to sequences which represent a serial relationship of subcomponents. Tracks within a track group are defined to start at the same time. Along with the information stored by virtue of being segments, a track group includes the following information:

1) Track information array
   a) Mark-In
   b) Mark-Out
   c) Pointer to track
2) Ganged?
3) Gang length A track group contains a list (1) of its subcomponents, or tracks. For each track within a track group there is a track number implied by its position in the list of tracks, e.g., for n tracks, a number from 0 to n−1. Other implementations may use other ways of identifying the tracks, such as by a numeric or string label attached to the track. Track groups also contain Mark-In and Mark-Out positions (a, b) for each track which are used to mark places where an edit should occur. Some of the editing operations (described below) on track groups refer to these marks when determining where to make a change. Also, for each track in the track group, a pointer (c) is provided to indicate the component which makes up the track.

Track groups not only represent concurrency, but also define a context, called a scope, in which individual tracks may be identified. This feature is used by the track reference component described above.

Track groups may also be used to represent media sources that are related in some fashion. For example, a track group of video data may contain 4 sub-tracks representing 4 multi-camera angle shots. Within the top level track, an indication could be provided to identify which sub-track is to be played. With such a track group, a composition may be created, and later modified on a different system, with all of the information that was available to the original editor.

Another type of track group could be defined to represent that a graphic on one track is to be keyed over some video on another track within the track group. The track group would contain information about the key color.

Compound audio effects may also be represented in a similar fashion, by having an audio track and some source clips for pan, volume and equalization settings. Such a track group would specify the way in which these values are to be combined to produce a single, playable track.

A special kind of concrete subclass track of group is called a simultaneous group 44 (FIG. 2). This group uses the ganged? (2) and ganglength (3) fields of the track group class. For a simultaneous group, ganged? (2) is a boolean value set to true. This indicates that all tracks in the group also have the same length as defined by the ganglength (3).

Composition

A composition 45 (FIG. 2) is a concrete subclass of the simultaneous track group class, and contains one or more tracks, in which each track may be considered a logical player channel, and therefore is of a single media type (video, audio, etc.). All tracks in a composition start at the same point in time as defined by the track group class.

Compositions, due to inheritance from the simultaneous track group class, impose that all tracks within a composition are played simultaneously and are synchronized by the start of the composition. In addition, tracks within the composition are ganged (that is, they have the same length). If a track in a composition becomes shorter during editing than the other tracks of a composition, it is padded out with appropriated media (i.e. black video, or silent audio) to make up the shortage.

Figure 3:
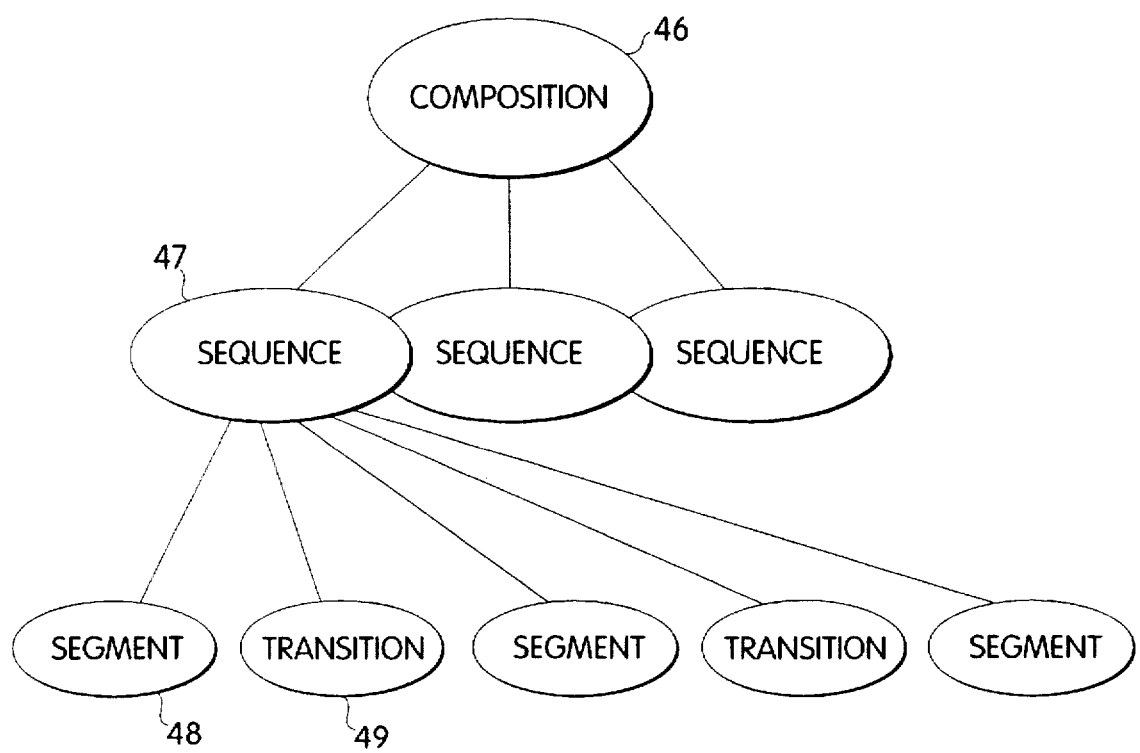
FIG. 3 is a diagram illustrating the hierarchy of a composition.

A composition created using these objects may have an arbitrarily deep hierarchical structure. An example of the resulting structure is shown in FIG. 3. A composition 46 is a track group of a number of tracks 47. In this example, there are three. Each track 47 is represented as a sequence in this figure. A sequence 47 is composed of a number of segments and transitions 48 and 49. Each segment 48 in this sequence may also be composed of any number of components, such as another track group, another sequence, or simply a source clip. It should now be readily apparent that such a combination represents many different possible types of layering of media in a composition.

OPERATIONS

The operations on the aforementioned data structures will now be described in connection with FIGS. 4–30. Operations on data structures are expressed as editing primitives, and further editing operations. Editing operations known as primitives are "split", "dub", and "trim". Split splits an existing component at a specified point into components of the same type, representing the media stream on either side of the split point. Dub produces a copy of at least part of a component, giving both start and end points within the original component. Trim adjusts the leading edge or the trailing edge of a component to make it longer or shorter by some number of units.

Figure 4:
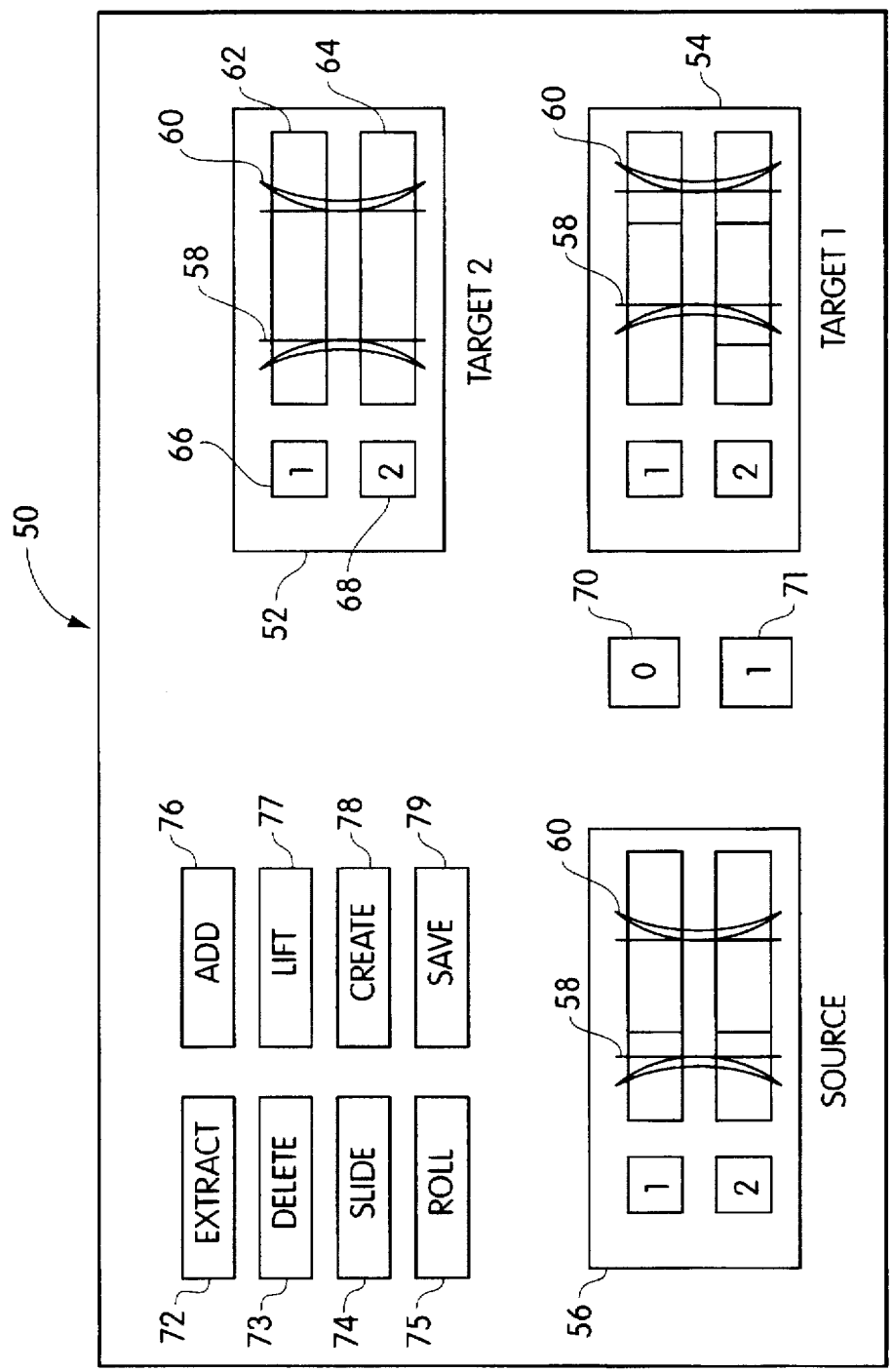
FIG. 4 is a diagram illustrating a suitable user interface for use with the present invention.

FIG. 4 shows a typical user interface 50 as it would be displayed on the output display device of computer system 20 and as would be seen by an editor using this system. A composition is represented by display areas 52 or 54 which are labelled "target 2" and "target 1", respectively. A display region 56, labelled "source", is used to represent source compositions from which material may be copied and placed into the compositions represented by display areas 52 and 54. A display area for a composition includes Mark-In markers 58 and Mark-Out markers 60. These markers may be moved by the editor to the left and to the right to select the portion of a composition in one of the display fields 52, 54 or 56. For a composition, a representation of each track, such as display regions 62 and 64 is provided. The position of the Mark-In or Mark-Out marker 58 or 60 indicates a position in time on the tracks. One pair of markers may be provided for a composition or separately for each track. A track may be selected by a user by positioning a cursor, such as a mouse cursor, on its corresponding track selector region, such as track selector regions 66 and 68 for tracks 62 and 64, respectively.

The display 50 also includes fields representing a number of functions which an editor may wish to perform on a composition. Buttons 70 and 71 represent overwrite and insert, respectively. Buttons 72–79 represent the functions of extract, delete, slide, roll, add, lift, create and save, which will be described in further detail below.

It should be understood that the display interface described above and shown in FIG. 4 is merely exemplary, as many different interfaces could be used in connection with this invention. It is also possible to include a video display region for displaying the contents of a specific frame of any video track within a composition. It should also be understood that a number of other editing functions may be provided and that the invention is not limited to those shown in this figure. For example, a variety of transitions between sequences, as described above, may be implemented and provisions for creating these transitions made in the user interface. From the teachings in this application, the implementation of such an interface is well within the scope of one of ordinary skill in this art.

The editing operations performed on a composition will now be described in further detail. In general, there are two types of operations: track operations and component operations. Track operations are those operations which are performed on portions of one or more tracks. Component operations are typically performed at the component level within a composition. Typical track operations include overwriting and inserting information on one or more tracks from source tracks, and extracting or lifting material from one or more tracks.

Typical editing operations will now be described briefly in terms of their functionality from the editor's point of view. It should be understood that a number of other editing functions may be used. An editor may create a composition, which is, quite simply, the initialization of a new composition component. Such initialization may be performed either by creating an empty composition to which material may be added, or by selecting source material to be the basis of a new composition. When a composition has been created, new tracks may be added or deleted. Within one or more tracks within a composition, an editor may extract or lift material. Extraction of material means its deletion from the track wherein material following the deleted material is concatenated with the material which preceded the deleted material. Lifting material means removing material from a track, and replacing it with filler. Material may also be inserted into a track from a source track. This is similar to cutting the original track and placing the source material within the cut. A portion of the track may also be overwritten with source material, wherein the source material is used to replace a selected portion of the target track. This is analogous to recording over a portion of a track.

Two other editing functions involve transitions at a cut between two segments on a track. The first of these functions is called "slide" and the second is called "roll". Slide and roll are defined in terms of types of trimming of transitions. One type of trim is called a symmetrical trim. With this kind of trim, the cut position is moved, but the frame positions in the segments on both the left and right sides of the cuts stay fixed in time. Thus, when material is deleted from one side of a cut, material is added to the other side from previous frames in that segment. Such frames are typically recorded on video tape or on the digital recording media storing the source material. A second type of trim of a transition is a left side trim. In a left side trim, material is added or deleted to the left of the cut, i.e. prior to the cut in a time reference frame. As a result, the cut is moved in time. A right side trim involves adding or deleting material to the right, or after, the cut. As a result, the cut is not moved in time, but material after the cut is shifted in time. Slide and roll are defined in terms of left and right side trims. A slide involves one segment located between two cuts, i.e., it is in between two other segments. When sliding a segment, the transition from the preceding segment is trimmed using a left side trim. The transition to the following segment is trimmed using a right side trim. The effect of a slide is that the position of the preceding and following segments remains the same, however the cuts between the adjacent segments and the slid segment are moved.

A roll, in contrast to a slide, maintains the transitions in the same place, but the source material used for the rolled segment is changed. This function is similar to scrolling through the source material. A roll is implemented by doing a right side trim on the preceding transition and a left side trim on the following transition.

Flow charts describing track operations, such as overwrite, insert, replace, extract and lift will now be described in further detail in connection with FIGS. 5–28.

Figure 5:
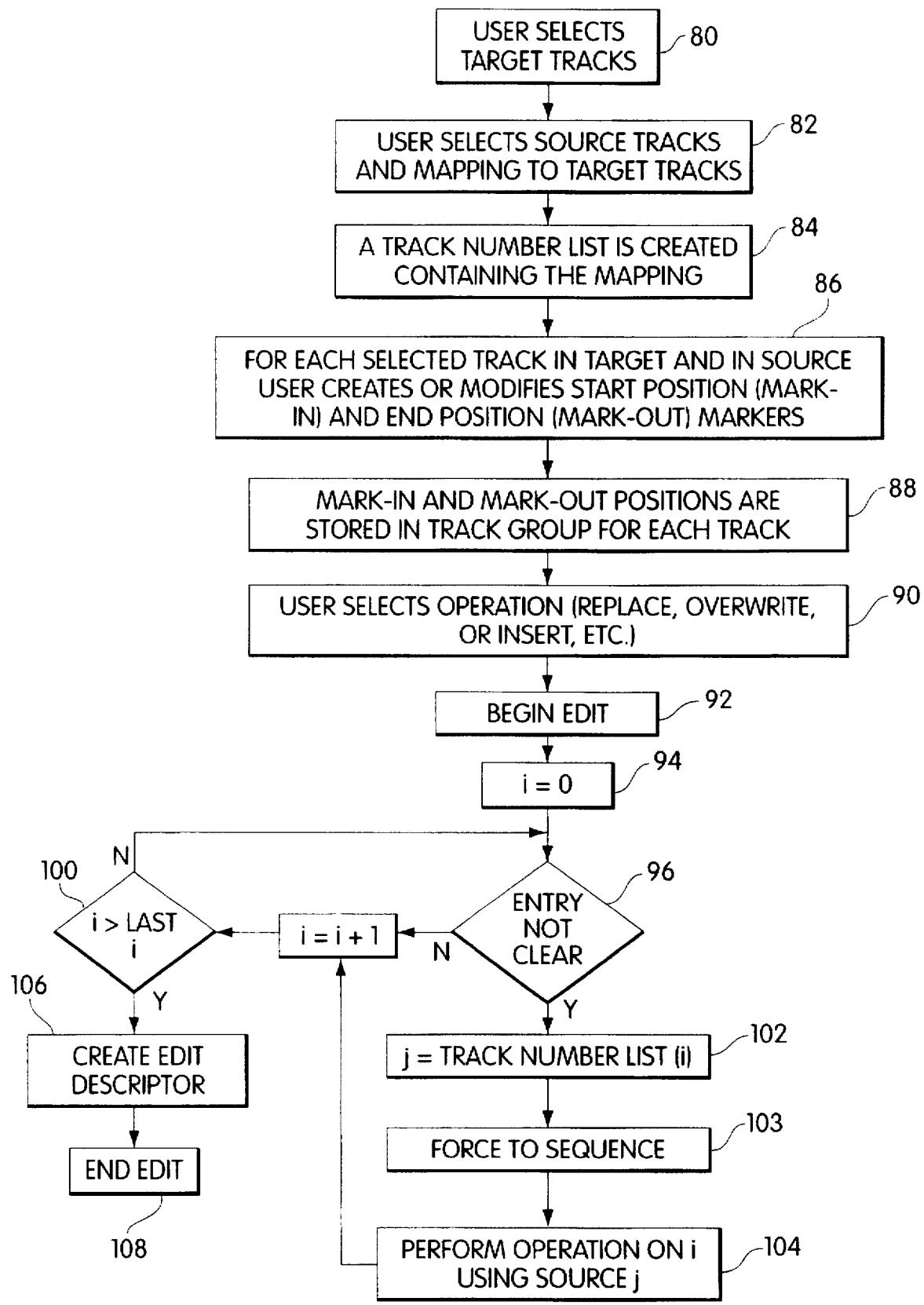
FIG. 5 is a flow chart describing operations on source and target materials.

FIG. 5 represents a flow chart for performing a replace, overwrite or insert operation, or other operation using both source tracks and target tracks. As the first step 80 of this process, the user selects target tracks in a manner as described above in connection with the user interface of FIG. 4. The user may then, in a similar manner, select source tracks (step 82), and a mapping of the source tracks to the target tracks. Such a mapping may be provided by a number of methods, such as by positioning a mouse cursor on a source track and dragging the source track to the target track. Further, "buttons" representing possible mappings may be provided on the user interface and may be selected by the user by positioning a mouse cursor on the button. After source and target tracks are selected, along with their mapping, a track number list is created in step 84 which contains the mapping. The track number list is, for example, an array with a length equal to the number of tracks in the target composition. An element of the array is indexed by the track number of the target composition. The contents of an element of the track number list array is the number of the source track which is mapped to the corresponding target track. If a target track does not have a source track mapped to it, the value stored in the track number list is a value indicator that it is not selected.

The user also selects, for each selected track in a target and source, start and end positions (mark-in and mark-out positions). The user performs this operation by, for example, positioning a mouse cursor on one of the markers 58 or 60 (as shown in the user interface of FIG. 4) and dragging the object to a desired location. The resulting mark-in and mark-out positions are then stored, for each track in the track group in step 88.

It should be understood that steps 80 through 84 are independent of steps 86 through 88 and that both of these sets of steps may be performed in any order and any number of times by a user. However, a user typically selects tracks first, and then provide the mark-in and mark-out positions. After tracks and mark-in and mark-out positions are selected, the user selects an operation to be performed in step 90. When the operation is selected, the computer performs a function, to be described in more detail below, called "begin edit" (step 92). After that function is performed, the operation continues with step 94 of setting a variable i to 0, for the purpose of performing a loop as identified by steps 94 through 104. The effect that this loop is that for each target track which is selected, the user selected operation is performed using that track and the source track which is mapped to it. In order to do this, the with entry of the track number list is examined in step 96. If that entry does not contain a track number value, the value i is incremented by one in step 98. It is then determined in step 100 whether the current value of i is greater than the length of the track number list. If i is still an element of the track number list, the processing continues with step 96 as described above.

If, in step 96, it is determined that the with entry of the track number list contains a track number, a value j is set to be that track number value in step 102. The selected portion of track i is then forced to be a sequence in a manner to be described below in connection with FIG. 12. The selected operation is then performed on track i using source track j, in step 104. The details of the processes of the selected operations will be described in more detail below in connection with FIGS. 13 through 30. Upon completion of the operation, processing continues with steps 98 and 100 until all of the elements of the track number list have been examined. At this point, the edit is complete and an edit descriptor is created in step 106, the process of which will be described in more detail below. The operation is completed by performing a function, hereinafter called "end edit", which will be described in more detail below in connection with FIG. 7.

A flow chart for track operations which do not use a source track will now be described in connection with FIG. 6. The first few steps for these types of track operations, such as extract and lift, are similar to those for track operations which use source tracks. Thus, the user selects target tracks in step 80 and a track number list is created containing a mapping in step 110. The mapping is different in this case in that a track number list merely has an indication of whether or not it has been selected, and any valid track number may be used. The user also selects-mark-in and mark-out positions for each selected track in steps 86 through 88 which are identical to steps 86 and 88 of FIG. 5. Again, steps 80 and 110 may be performed independently as steps 86 and 88. After the user has selected a target track and the mark-in and mark-out positions, an operation is selected in step 112, such as extract or lift. The computer then processes the operation by performing the "begin edit" function in step 114. The computer steps through each entry of the track number list to determine whether the corresponding track had been selected, forces the selected portion of the track to be a sequence, and performs the operation on each selected track. The computer performs these steps using steps 116 through 124 which are similar to steps 94 through 104 as described above in connection with FIG. 5. The specific operations performed in step 124, such as extract and lift, will be described in more detail below in connection with FIGS. 22 and 23. When the operation has been performed on each track, an edit descriptor is created in step 126 and the end edit function is performed in step 128, in a manner similar to steps 106 and 108 of FIG. 5.

The "begin edit" function, as mentioned above, will now be described. This function operates on a component by incrementing the edit nesting count for that component. It establishes the beginning of an edit operation which is composed of multiple editing steps, and is used later to prevent propagation of an edit description for each step. For the operations described in FIGS. 5 and 6, a begin edit is performed on the track group and increments the edit nesting count for that track group. For example, if the track group is a composition, the edit nesting count of the root component is incremented.

The creation of an edit descriptor (step 106 of FIG. 5 and step 126 of FIG. 6) will now be described. The edit descriptor is a data structure that captures significant features of a change to a component due to an edit. It contains the left most time affected the change (the left bound), the right most time affected by the change (the right bound). The right bound may be a special value indicating that the change is not bounded on the right. The value is preferably the largest integer. Within the changed region, part of the region may be designated as a time shifted region. The offset of the shifted region from the left bound is stored as the sync offset. The amount and direction of the shift in the shifted region is also part of the edit descriptor, and will be called hereinafter as "sync shift". The edit descriptor could be expanded to include other parameters describing more detail about the change.

The edit descriptor generated for replace, insert, overwrite, extract and lift commands will now be described. For all of these operations, the left bound is the mark-in position on the target track. For replace and overwrite, the right bound is the mark-out position on the target track. For both of these functions, the sync offset and sync shift are both 0. A replace is similar to an overwrite, except that if the replaced portion has a length which is different from the portion replacing it, the right bound is unbounded. The difference between the length of the source material and the length of the target material is the sync shift which begins at a sync offset defined by the minimum of the length of the source material and the length of the target material replaced. The insert and extract functions both have a right bound which is unbound, and an offset of 0. The sync shift for an insert is the length of the inserted material. Similarly, the sync shift for an extract is the negative of the length material extracted. Edit descriptors for other types of functions will be described in more detail below as the functions are described.

Figure 7:
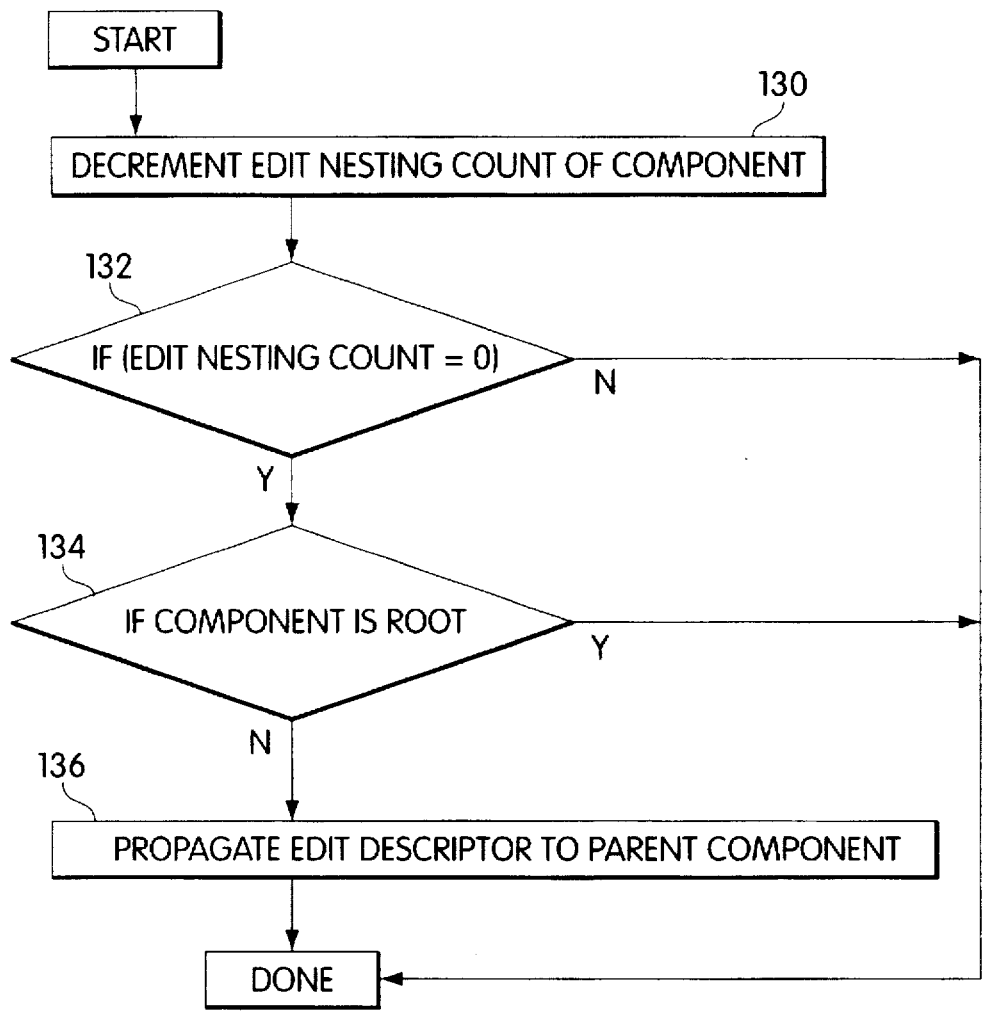
FIG. 7 is a flow chart describing a function for ending an edit operation.

The "end edit" function will now be described in connection with flow chart of FIG. 7. This function establishes the end of the edit operation and propagates the corresponding edit description, unless the operation was nested inside another.

This operation is performed on a particular component and an edit description. For example, in steps 108 (FIG. 5) and 128 (FIG. 6) the end edit function is performed on the target track group component. The first step 130 of the end edit function is decrementing the edit nesting count of the component on which it is operating. If the edit nest count becomes 0, as determined in step 132, and if the component is the root component of the composition, as determined in step 134, this operation is complete. If the edit nest count is not 0, this function is terminated. If the component was determined, in step 134, not to be the root of the composition, the edit description is propagated to the parent component in step 136. This propagation will be described in more detail in connection below with FIG. 8.

Figure 8:
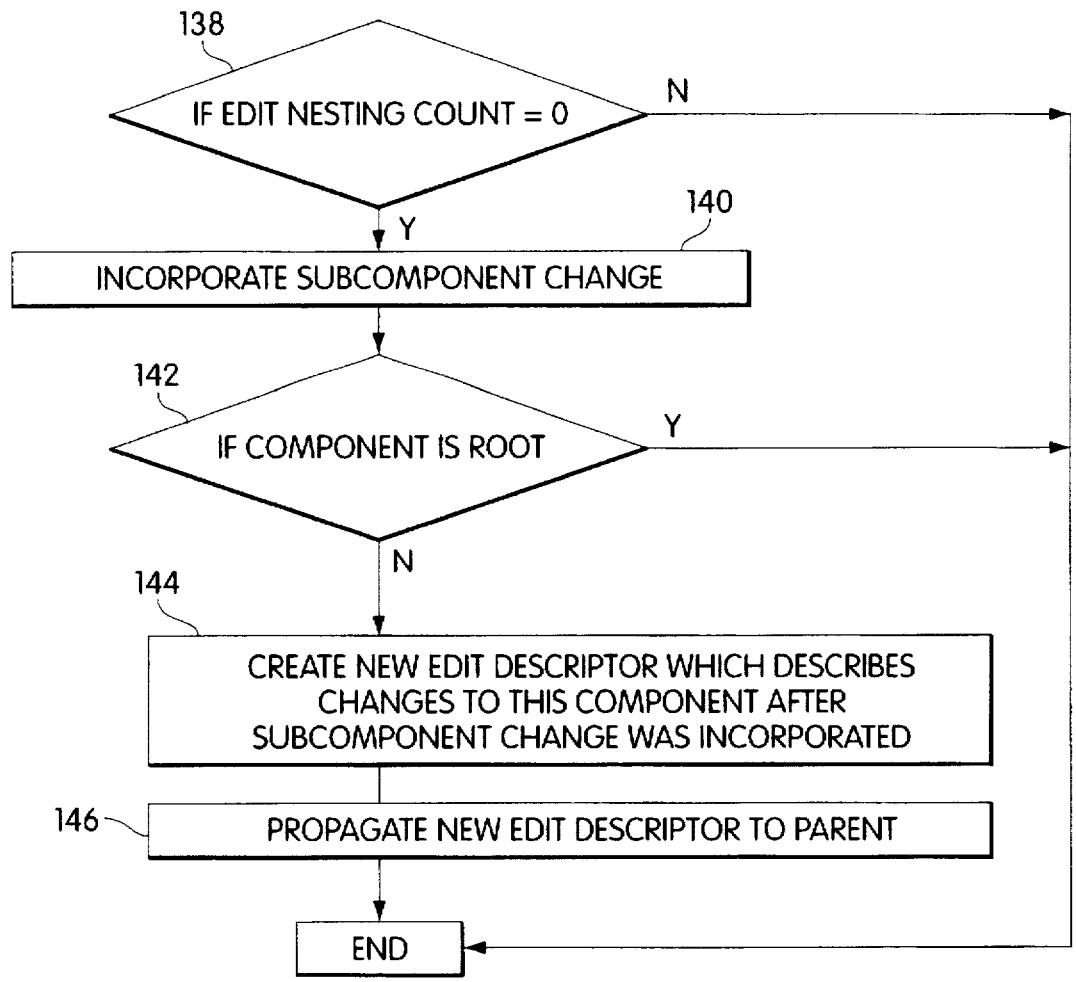
FIG. 8 is a flow chart describing how an edit description is propagated.

The propagation of an edit description to a component, from its child component will now be described in connection with FIG. 8. If the edit nest count of the component is equal to 0, the change, described by the edit descriptor, to the subcomponent is incorporated into other subcomponents of this component in step 140. This incorporation involves performing any necessary operations on a component to react to the change in its subcomponent. This operation will be described for particular components in more detail below.

After step 140 is completed, if the component is the root component, as determined in step 142, this process ends. Similarly, if the edit nest count, as determined in step 138, was equal to 0, processing also ends. If the component is not the root component, a new edit descriptor is created which describes changes to this component after the subcomponent change was incorporated (step 144). That is, the edit description for the subcomponent is translated into the time reference frame of this, its parent, component. For a sequence, the left bound and right bound are simply increased by the offset of the subcomponent within the parent. For a track group, the edit descriptor remains the same. After the new edit descriptor is created, it is propagated to its parent and steps 138 through 146 are repeated for that parent and any further parents.

The incorporation of a subcomponent change into its parent component, as mentioned in step 140 of FIG. 8, will now be described in connection with FIGS. 9–13. The function of this operation is specific to the kind of component which is applied. It operates on a component along with its edit description and the identifier of the subcomponent which was changed. The function may be different for each type of component, and performs any necessary work in a component for reacting to a change in one of its subcomponents.

For track groups, a change in a subcomponent may cause an edit to occur on another track in the same track group such that track relationships enforced by the track group are maintained. For a sequence, this step is performed by modifying the 2–3 tree representing the sequence to assign a new value to the subcomponent indicated by the identifier of that subcomponent. The modification of the 2–3 tree is based on the values provided from the edit description lists. The change in the subcomponent is propagated up to all higher parent nodes in the tree.

Figure 9:
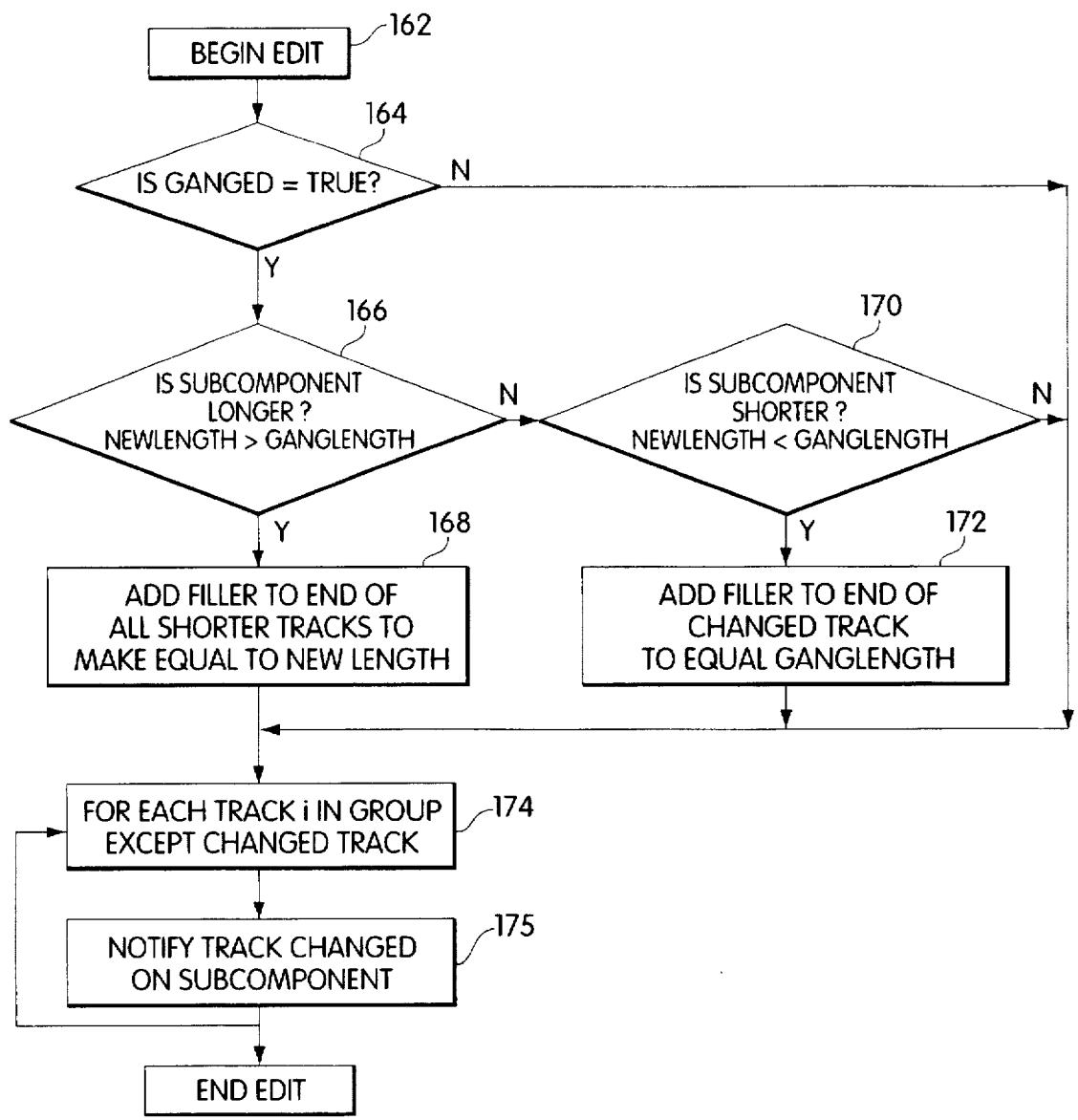
FIG. 9 is a flow chart describing how changes to a subcomponent in a track group are incorporated into the track group.

The incorporation of a subcomponent change for a track group component will now be described in connection with the flow chart of FIG. 9. This procedure begins with the "begin edit" function as applied to the track group component (step 162). If the track group is ganged, as determined in step 164, it is then determined whether the new subcomponent is longer than the given gang length (step 166). If the subcomponent is not longer than the gang length, filler is added to the end of all shorter tracks in the track group to make them equal to the new gang length (step 168). Otherwise, it is determined whether the subcomponent is shorter, in step 170, and if it is, a filler is added to the changed track to bring it to the correct gang length in step 172.

If the track group is not ganged, or after a gang track group has been modified so that all tracks are of the same length, for each track in the track group, except the changed track, a notification is sent in step 175 to that track, to propagate change information downwards below the changed subcomponent of the composition. This notification step may be implemented differently for different types of components since different components have different constructions.

Notification operates on a component and includes a scope depth, a relative track number and an edit descriptor as its parameters. The scope depth is used to measure how many track groups have been traversed in a downward propagation. The relative track numbers used to indicate the distance between the track that changed and the track that is being notified. The scope depth is originally set to zero for the track group and which a subcomponent change was originally incorporated. The relative track number is the difference between the track number of the changed subcomponent and the current track number. The edit descriptor is that for the track group containing all the tracks to be notified.

Figure 10:
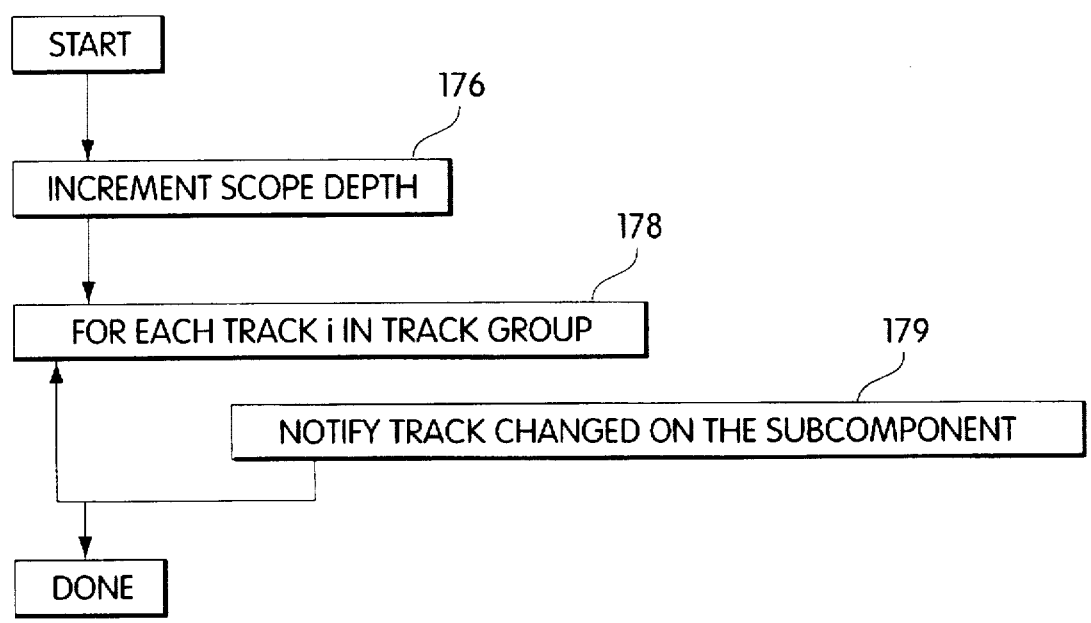
FIG. 10 is a flow chart describing how tracks in a track group are notified of a subcomponent change.

The notification to a track which is in itself a track group will now be described in more detail in connection with FIG. 10. The first step of this process is incrementing the scope depth as shown in step 176. The notification procedure is then recursively applied to each of the tracks within the notified track group in step 178. This function has the effect of passing down the notification of a change to all subtracks preserving the relative track number and edit description, but incrementing the scope depth.

Figure 11:
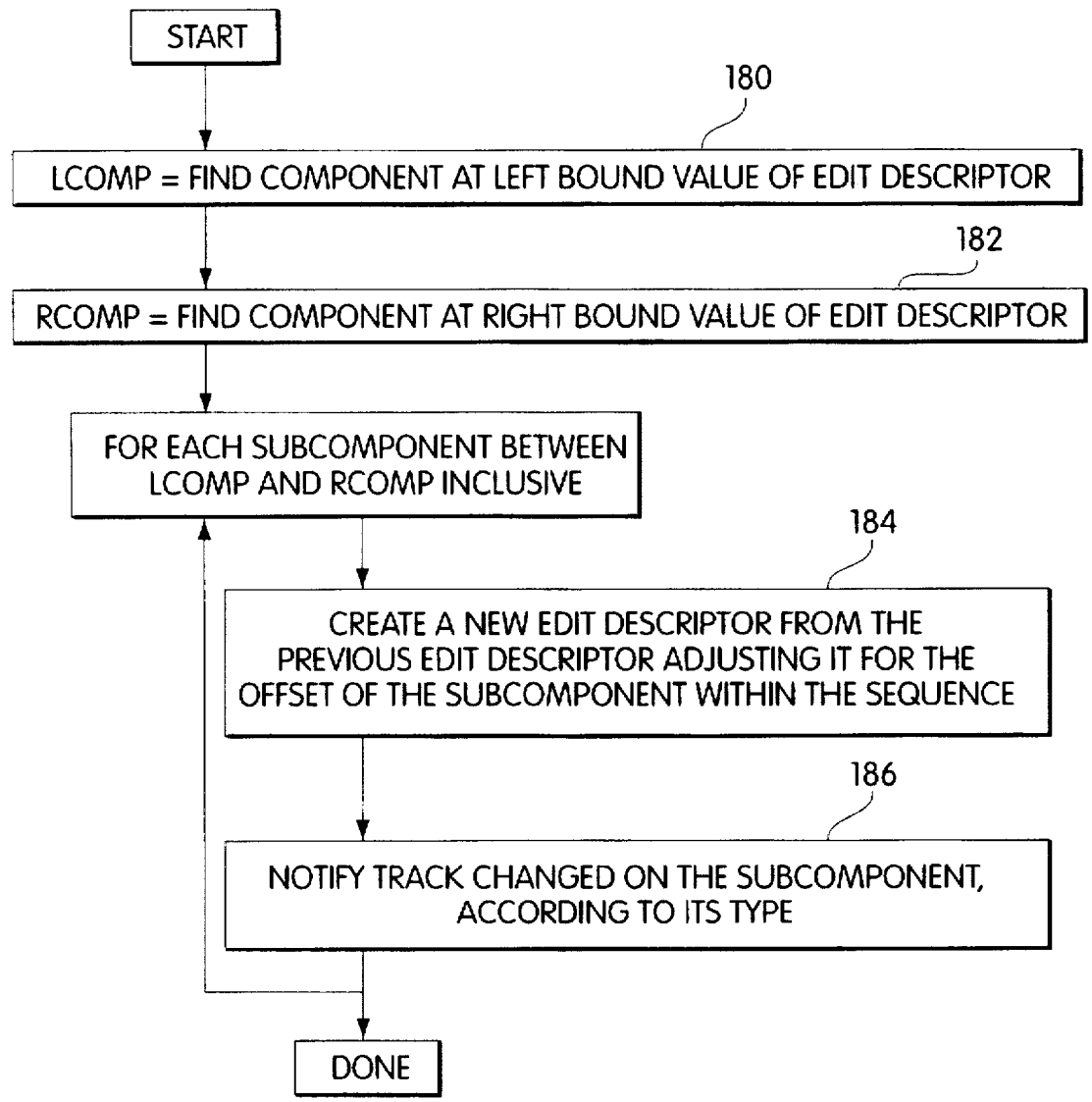
FIG. 11 is a flow chart describing how elements of a sequence are notified of a track change.

The notification of a track change as applied to a sequence will now be described in connection with FIG. 11. The first step is step 180 of finding the component in the sequence which is to the left of the changed subcomponent. This step is used by searching the sequence 2–3 tree for the component at the value indicated by the left bound value of the edit descriptor. Similarly, in step 182, the component to the right in the sequence is also found, using the right bound value of the edit descriptor. For each component between the left component and right component, inclusive, a new edit descriptor is created from the previous edit descriptor, adjusting it for the offset of the subcomponent within the sequence (step 184). Further, for each subcomponent the notification of the track change is propagated, according to the subcomponent type (step 186). The effect of this procedure is that the notification is passed down to all subcomponents of a sequence which are within the time bounds of the change.

Figure 6:
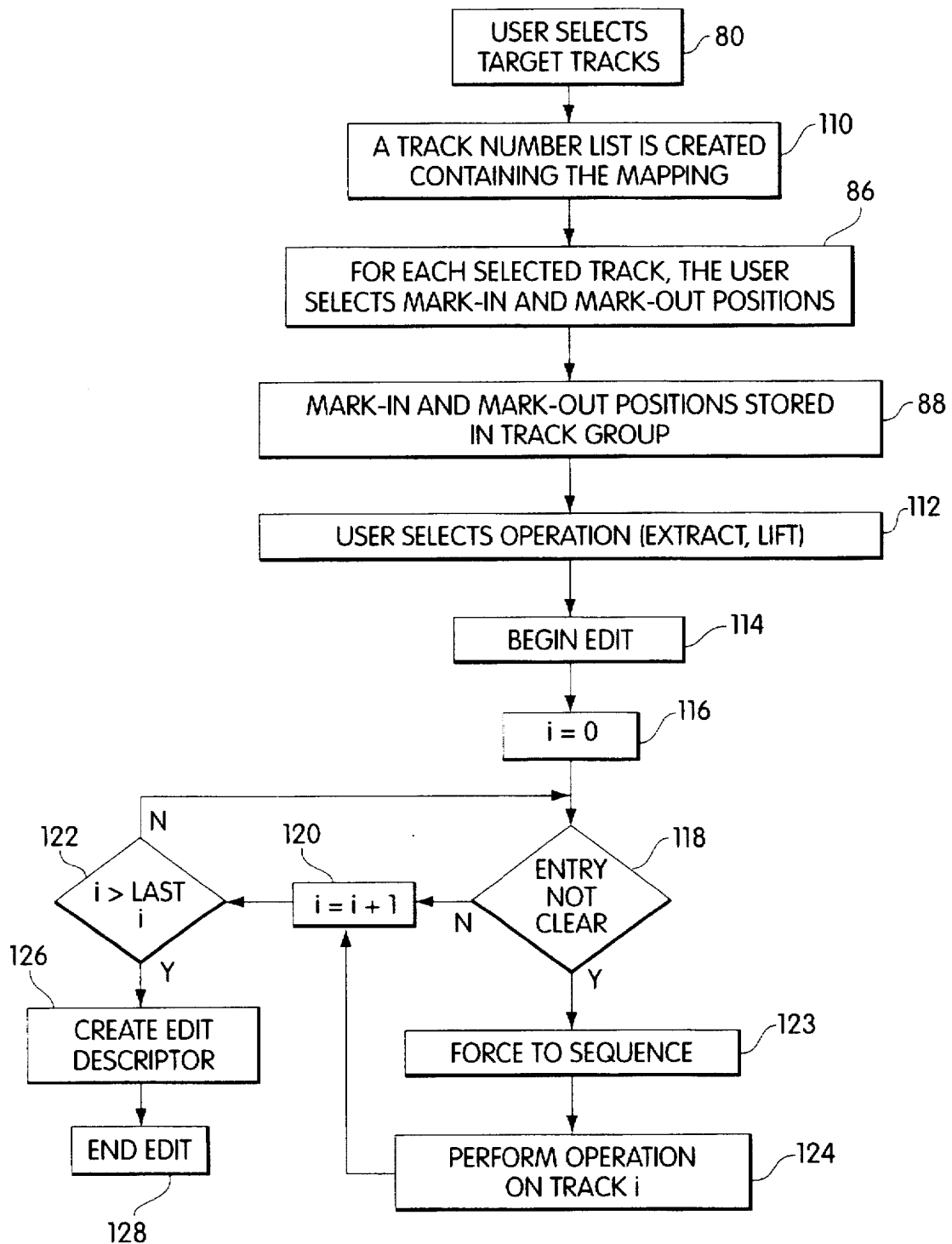
FIG. 6 is a flow chart describing operations on target materials.
Figure 12:
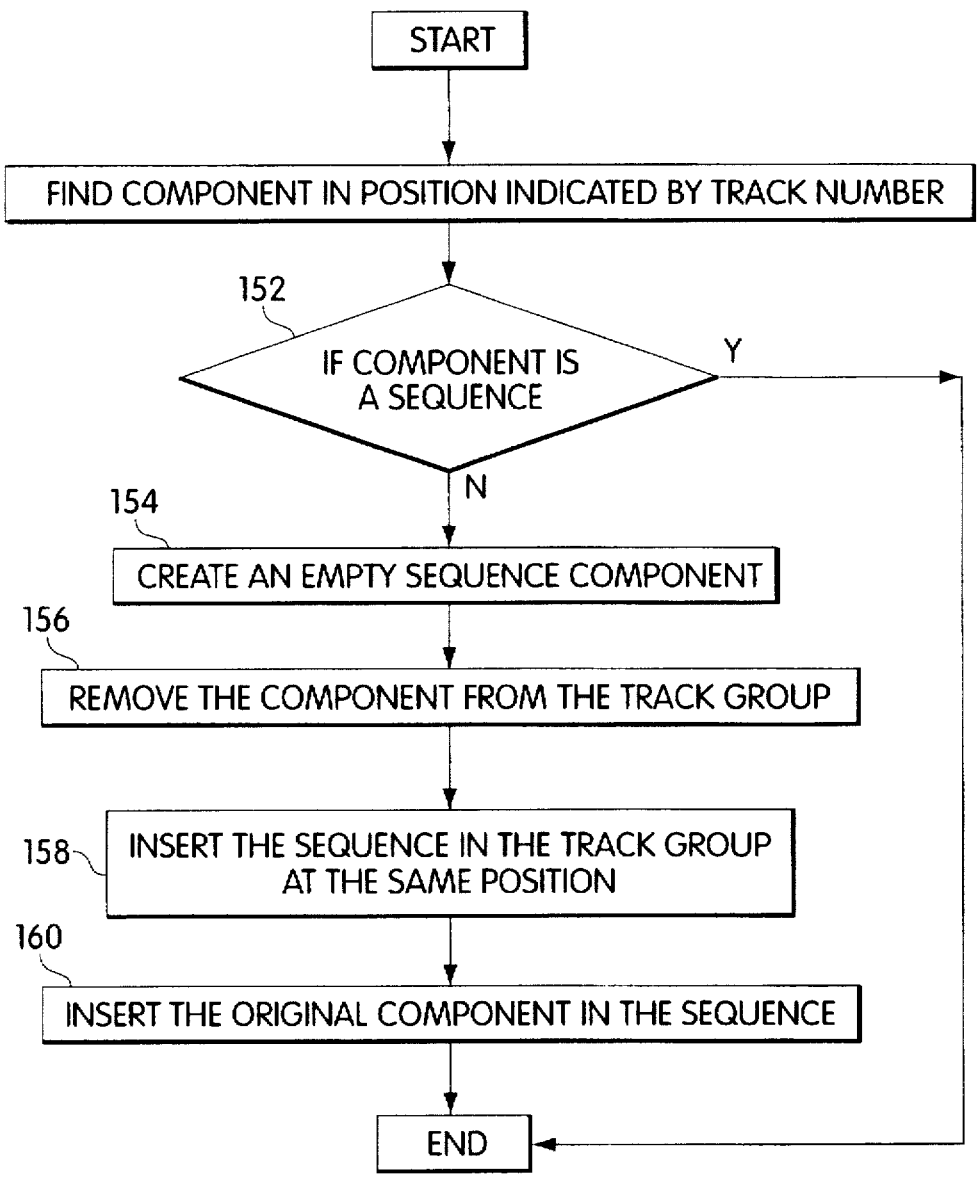
FIG. 12 is a flow chart describing how a component is forced to be a sequence component.

FIG. 12 is a flow chart describing how a section of a track is forced to be a sequence, as mentioned above in connection above with the flow charts of FIGS. 5 and 6 (steps 103 and 123). The flow chart of FIG. 12 describes a function which operates on a track group and a track number. If the specified track of a track group is not a sequence component, this function turns it into a sequence. This function is used because the track editing operations of REPLACE, OVERWRITE, INSERT, EXTRACT and LIFT act on sequences. The first step of this process is step 150 of finding the component indicated by the marking position in the specified track (step 150). If the found component is a sequence, as determined in step 152, processing is complete. Otherwise, an empty sequence component is created in step 154. The original component is removed from the track group in step 156 and replaced, in step 158 with the empty sequence component. The original component is inserted into the sequence in step 60. Then this process is complete.

Figure 13:
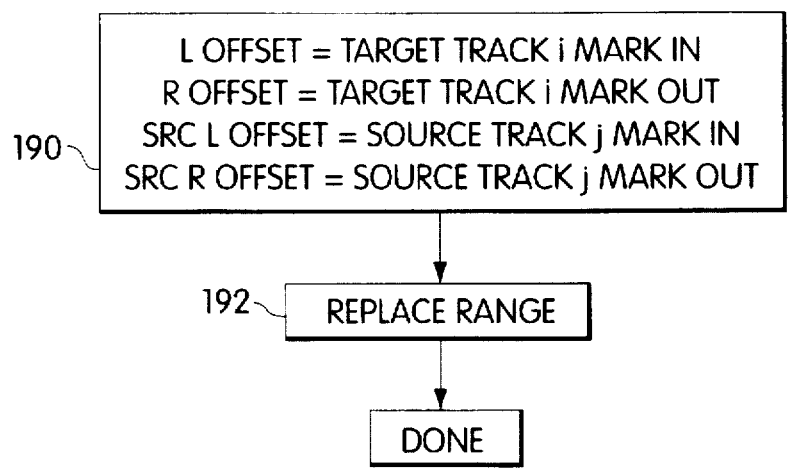
FIG. 13 is a flow chart describing how a replace operation is performed.

The procedures for performing the replace, overwrite and insert operations will now be described in connection with FIGS. 13 through 28. FIG. 13 describes the replace operation. The first step is setting variables left offset, right offset, source left offset and source right offset to values to be used for the replace operation (step 190). The left offset is set to the mark-in position on the target-track and the right offset is set to the mark-out position on the same target track. The source left offset and source right offset are respectively set to the source track mark-in position and the source track mark-out position. With these variables set, the indicated range in the target track is replaced with the indicated source track material in a manner to be described in more detail below (step 192) in connection with FIG. 15.

Figure 14:
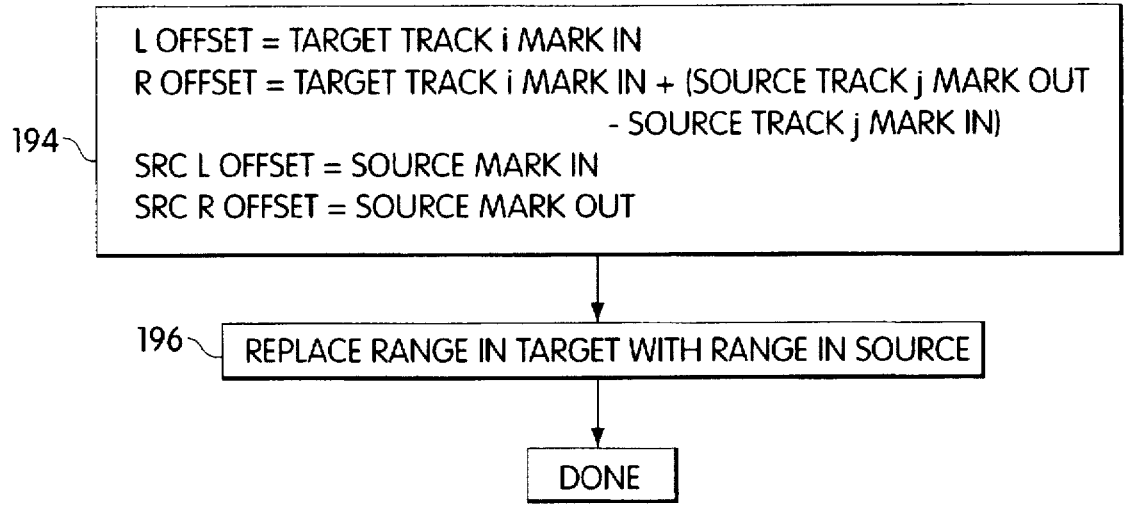
FIG. 14 is a flow chart describing how an overwrite operation is performed.

FIG. 14 describes an overwrite operation, which is similar to a replace operation. The first step 194 involves setting the left offset to the target track mark-in position and the right offset to the sum of the target track mark-in position and the difference between the source track mark-in and mark-out positions. The source left offset and source right offset are respectively set to the source mark-in and mark-out positions. (Step 194). With these variables set, the indicated range in the target track is replaced with the material indicated from the source track in step 196 in a manner to be described below in more detail in connection with FIG. 15. This step is identical to the step 192 of FIG. 13 describing a replace operation.

Figure 15:
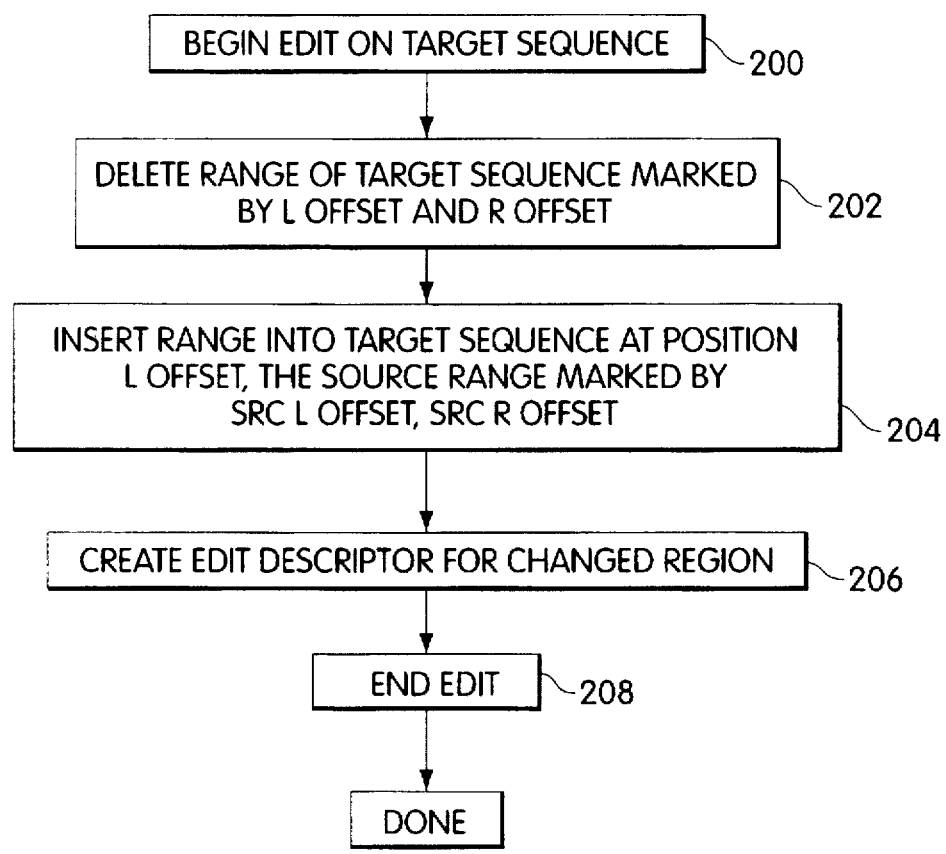
FIG. 15 is a flow chart describing how a range of material is replaced in a composition.

Replacing a range in a target with a source component will now be described in connection with the flow chart of FIG. 15. This procedure operates on a source component, the track containing the selected source material, and a target sequence. The target sequence may have been made by the force-to-sequence operation described above in connection with FIGS. 5, 6 and 12. The first step 200 of this procedure is performing the "begin edit" function on the target sequence (step 200). The range of the target sequence, as determined by the left offset and right offset values, is then deleted in step 202. This step 202 involves moving the subsequence indicated by the left offset and right offset values to a known destination, which will be described in more detail below in connection with FIGS. 16A–C.

After the range of the target has been deleted, the source material determined by the source left offset and source right offset from the source track is inserted into the target sequence at the position defined by the left offset (step 204). This process will be described in more detail below in connection with FIG. 17. After the source material is inserted, an edit descriptor is created in step 206 for the changed region and the "end edit" procedure, as described above, is performed in step 208.

Figure 16A:
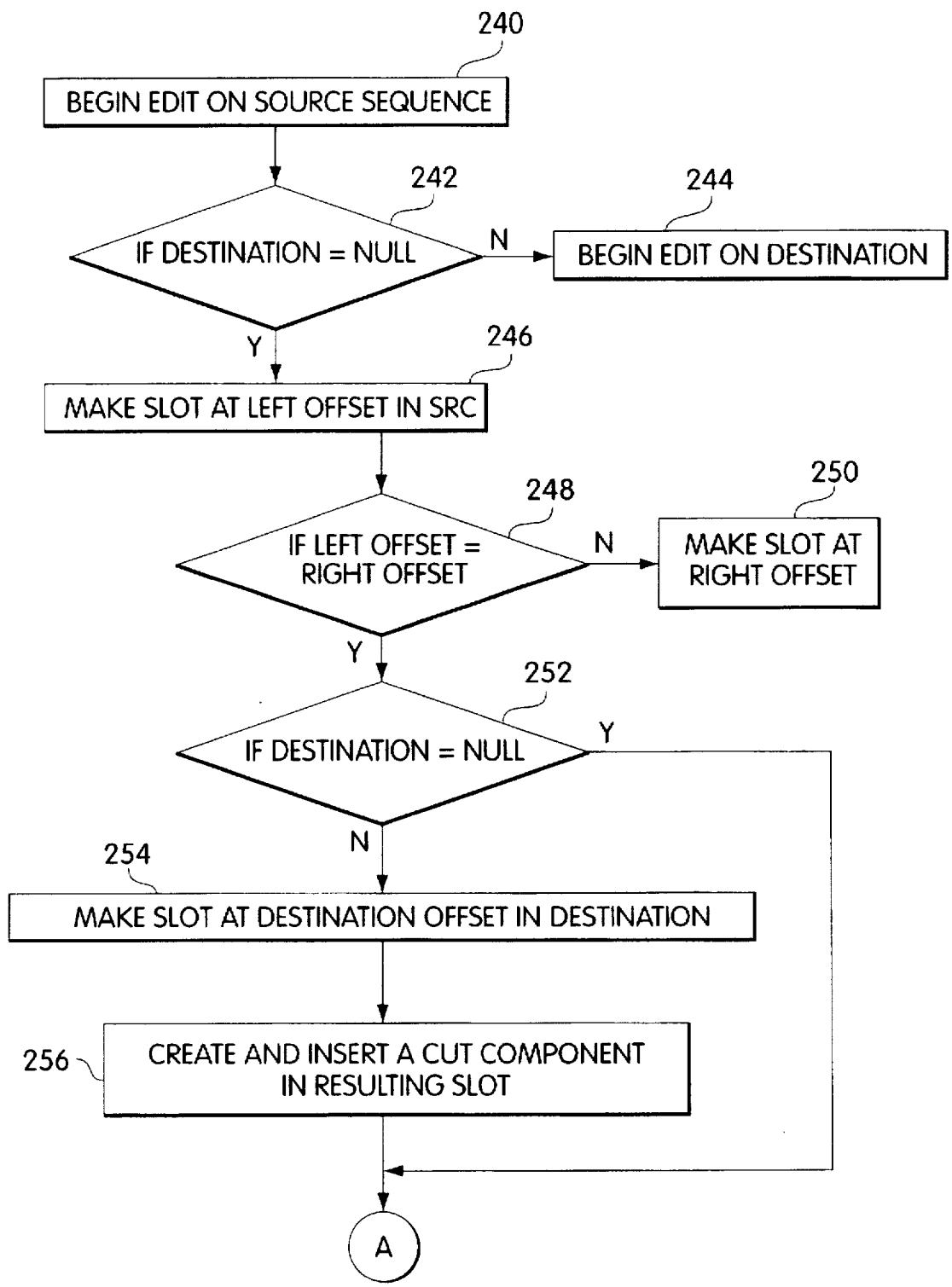
FIGS. 16A–C are flow charts describing how a subsequence is moved into another component.
Figure 16B:
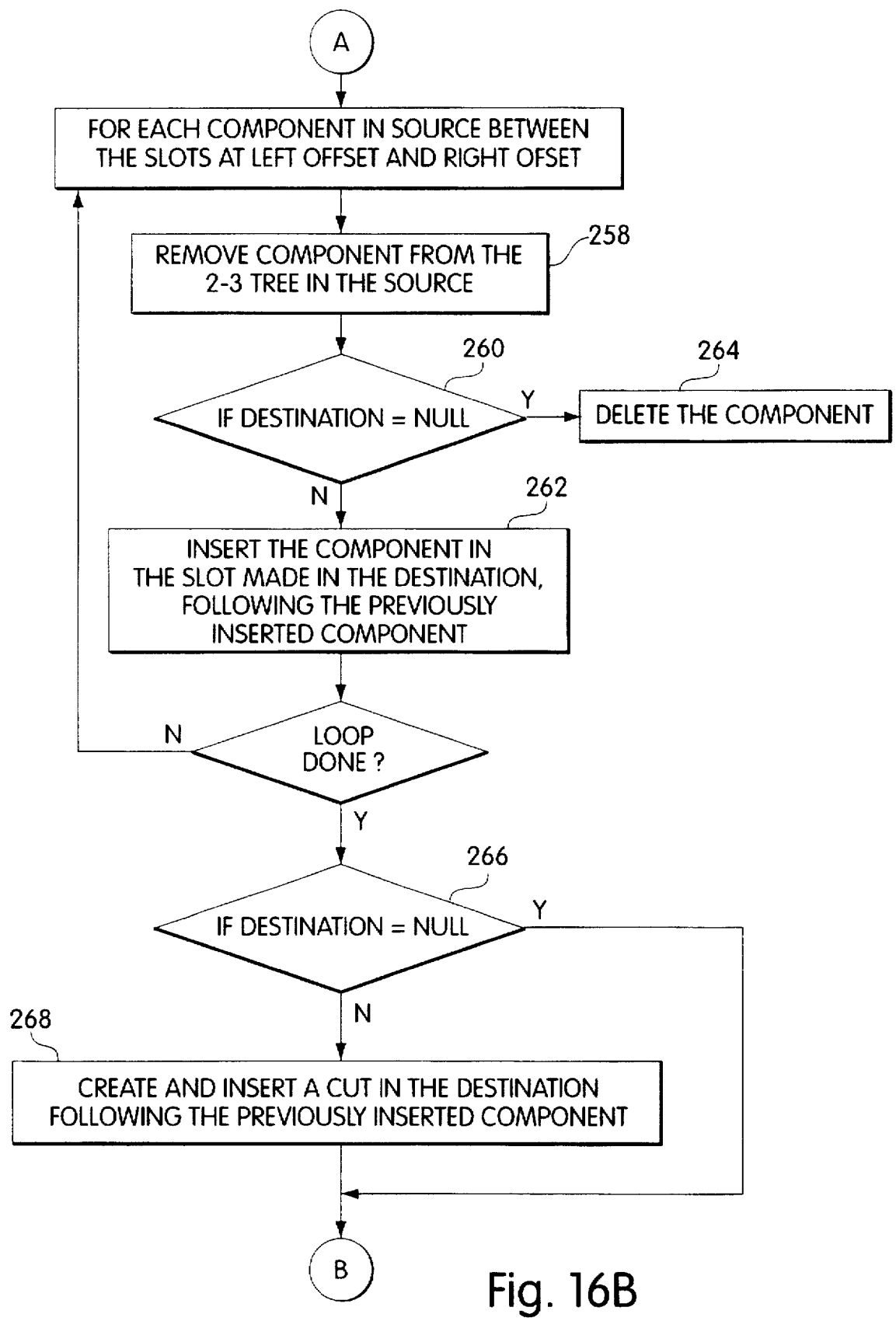
Figure 16C:
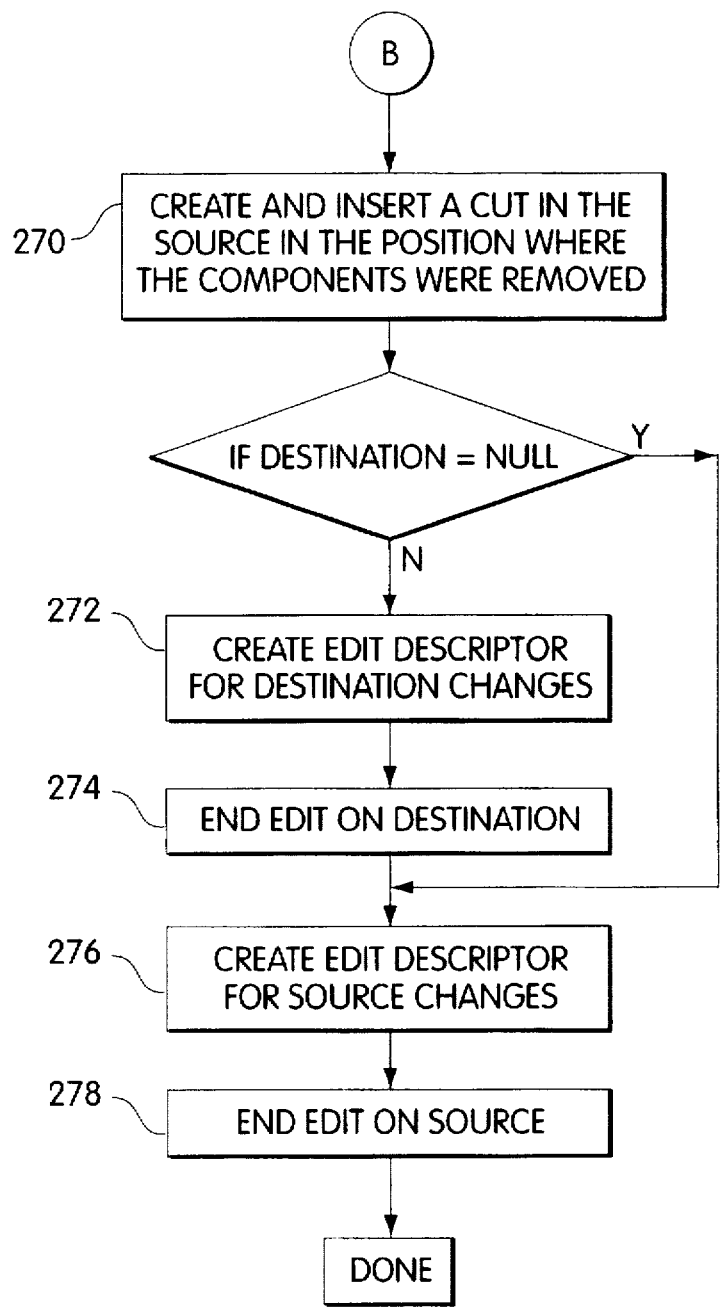

The process of moving a subsequence will now be described in more detail in connection with FIGS. 16A–16C. This operation, given a source sequence, a destination sequence, left and right offsets in the source, and a destination offset in the destination sequence, removes the components between the left and right offset from the source and inserts them at the destination offset in the destination sequence. If the destination sequence is specified as null, the removed components are deleted. The alternation of segments and transitions within a sequence is preserved by replacing the removed components with a cut component in the source and by surrounding the moved components in the destination by cuts.

The first step 240 of moving a subsequence is performing the "begin edit" function on the source sequence. If the destination sequence is not null as determined in step 242, the begin edit function is performed on the destination sequence in step 244. After steps 242 and 244, a slot is made at the left offset in the source in step 246, in a manner to be described in more detail below in connection with FIGS. 21A–B.

If the left offset is equal to the right offset, as determined in step 248, there is no need to make a slot at the right offset position in the source, otherwise a slot is made in the source at the right offset in step 250. After a slot, if any, is made at the right offset, if the destination sequence is not null, a slot is made at the destination offset in the destination sequence in step 254. A cut transition component is then created and inserted in the resulting slot in step 256. After the slot and cut transition are made, or if the destination is null, for each component in the source between the slots the left and right offsets, the component is removed from the 2–3 tree in the source. If the destination is not known, the component is inserted in the slot made in the destination sequence, following the previously inserted component, if any. If the destination is null, the component is merely deleted.

When all the components have been removed from the source, and if the destination is not null, a cut is created and inserted in the destination sequence following the previously inserted component in step 268. Next, a cut is created and inserted in the source in the position where the components were removed (step 270). If the destination is not null, and an edit descriptor is created for the changes in the destination sequence and the end edit function is performed on the destination sequence. Next, an edit descriptor is created in step 276, for the changes in the source, and the "end edit" function is performed on the source in step 278.

Figure 17:
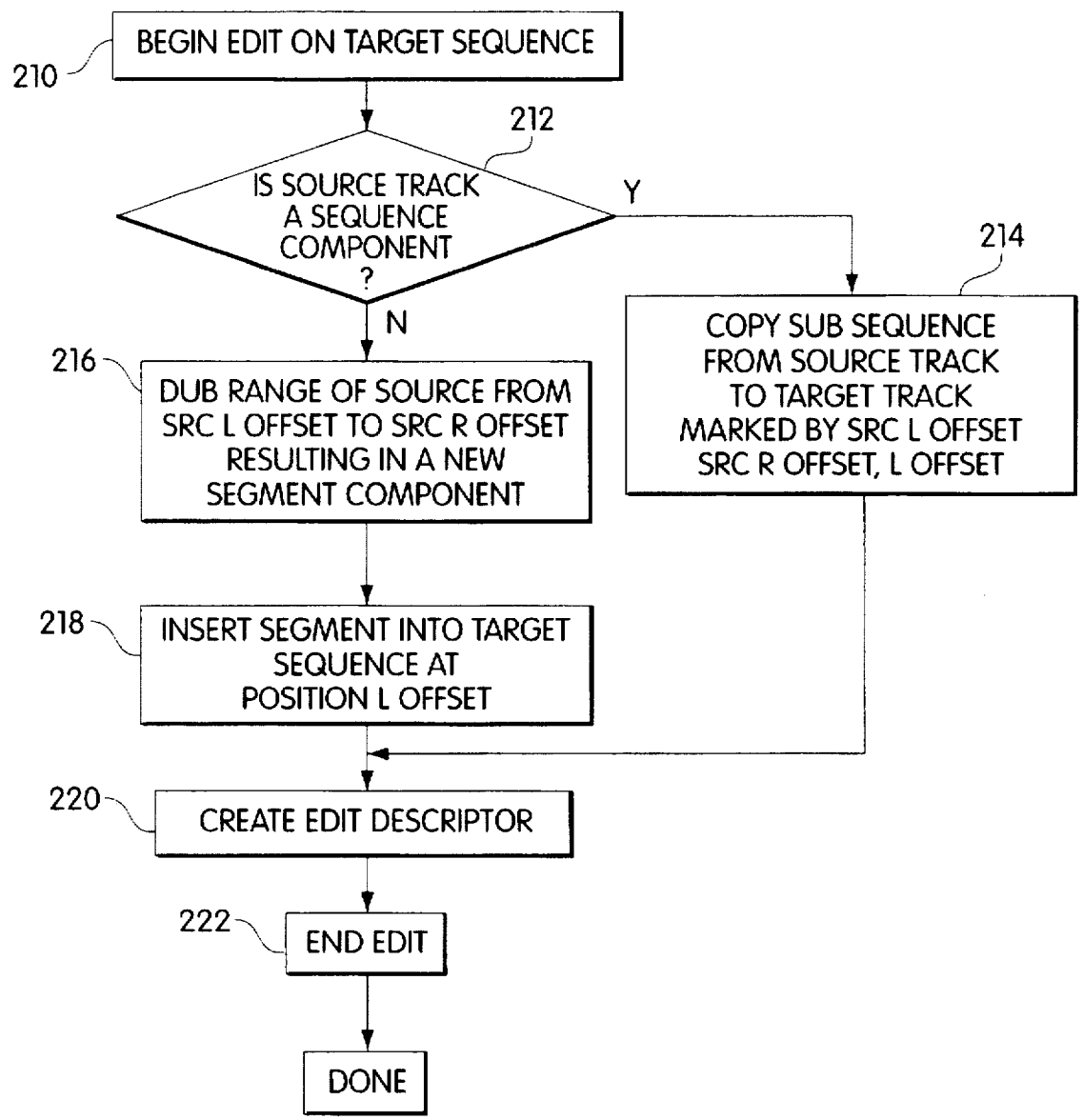
FIG. 17 is a flow chart describing how a range of material is inserted into a sequence.

The step of inserting a range of source material into a target sequence (as performed in step 204 of FIG. 15) will now be described in more detail in connection with FIG. 17. This procedure makes a new component, representing part of a source component, and inserts the new component into the target sequence. If the source is a sequence, instead of making and inserting a new component, which would result in a sequence nested inside a sequence, this procedure provides that individual relevant subcomponents of the source sequence are copied and inserted into the target sequence.

This procedure begins with the "begin edit" procedure as performed on the target sequence (step 210). If the source track is a sequence, as determined in step 212, the subsequence, as determined by the source left offset, and source right offset is copied from the source track to the target track at the location marked by the left offset (step 214). This step of copying will be described in more detail below in connection with FIGS. 20A–C.

If the source track is not a sequence component, the range of the source material from the source left offset to the source right offset is dubbed in step 216 to result in a new segment component. This process of dubbing will be described in more detail below in connection with FIGS. 27A–B. The dubbed segment is then inserted into the target sequence at the position defined by left offset (step 118), in a manner to be described in more detail below in connection with flow chart of FIG. 18.

After the subsequence is copied in step 214, or the segment is inserted in step 218, an edit descriptor is created in step 220 and the "end edit" function is performed on the target sequence in step 222.

Figure 18:
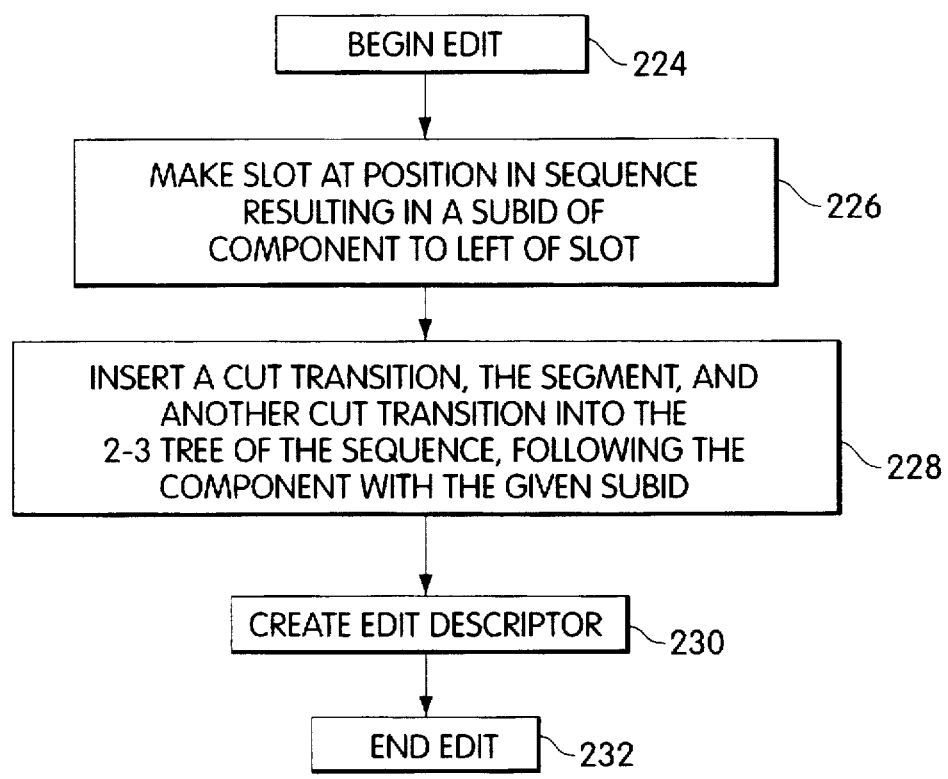
FIG. 18 is a flow chart describing how a segment is inserted into a sequence.

The process of inserting a segment, as used in step 218 of (FIG. 17) will now be described in connection with the flow chart of FIG. 18. This procedure, given a position in a sequence, inserts a new segment into the sequence at that position. For the process of inserting a range of source material into a target sequence, that position is the left offset.

Figure 21A:
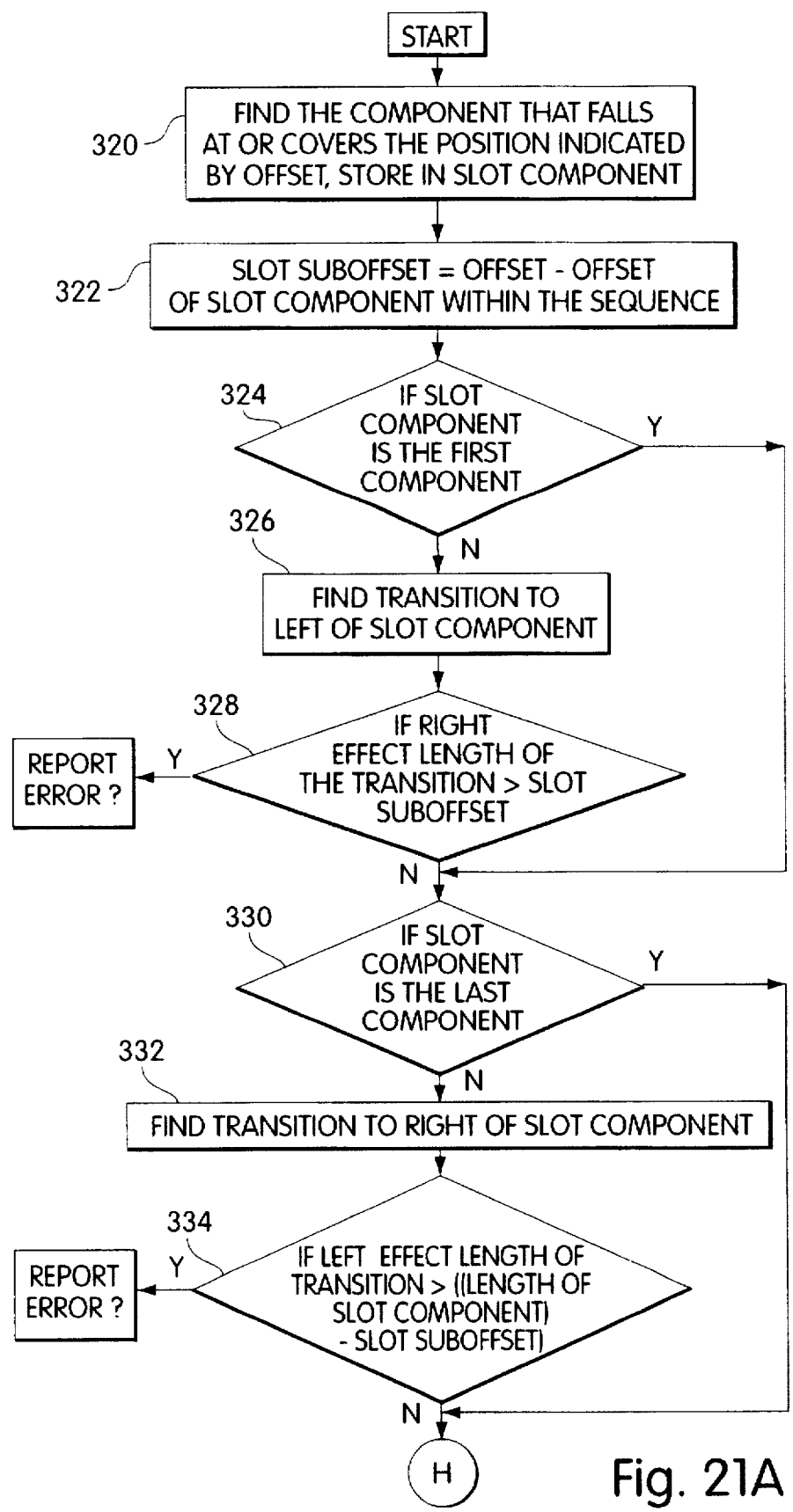
FIGS. 21A–B are flow charts describing how a slot is made.
Figure 21B:
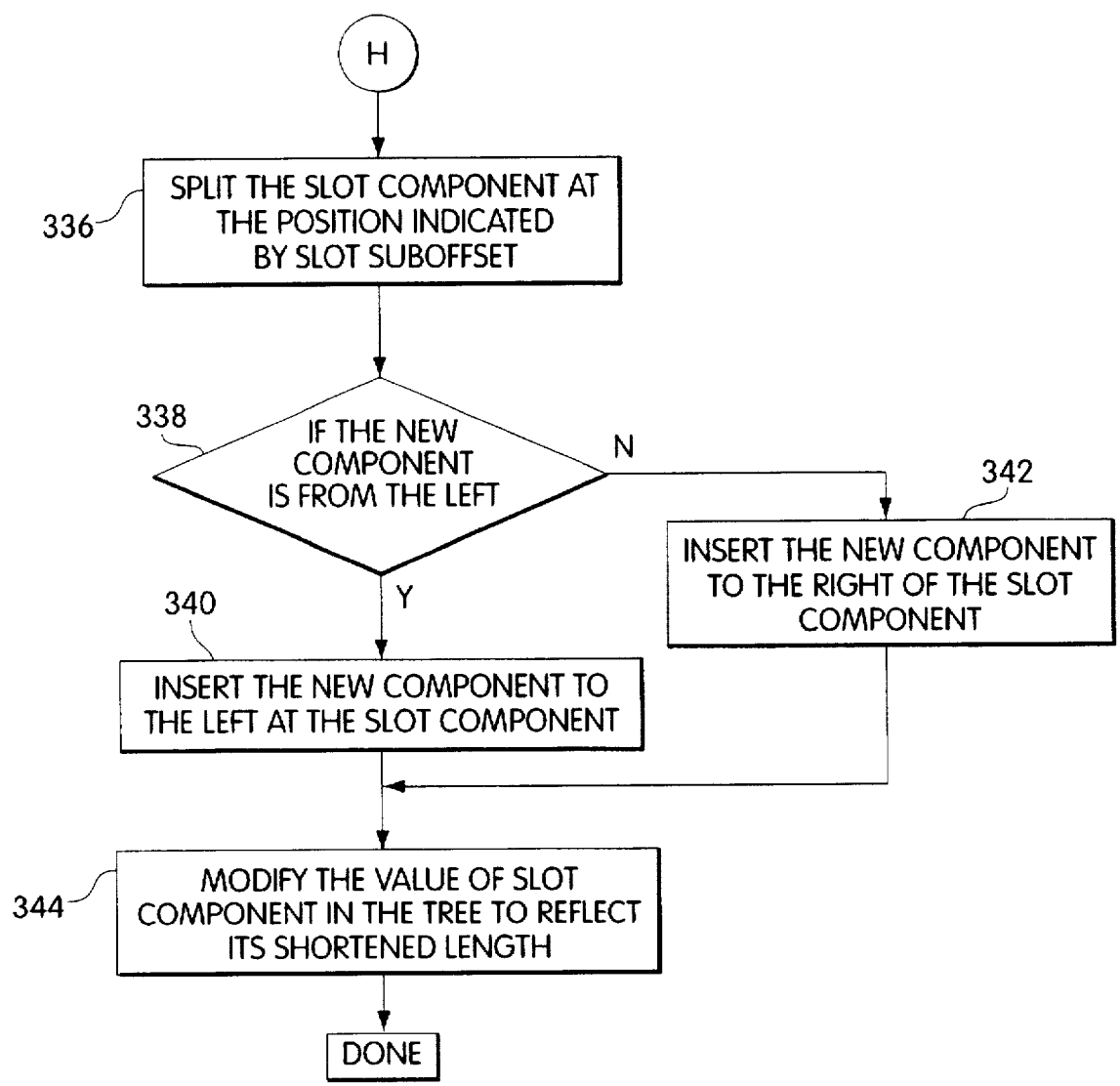

This process begins with the "begin edit" procedure of step 224, after which a slot is made, in step 226, at the selected position in the target sequence, in a manner to be described below in connection with FIGS. 21A–B. When a slot is made, a value is returned which indicates the subidentifier of the component to the left of the slot made. A cut transition, the segment, and another cut transition are then inserted into the 2–3-tree of the sequence, immediately following the component with the subidentifier returned by the making of a slot (step 228). This step inserting the transition segments in the tree is a standard tree operation, as described above in connection with the description of the 2-3-tree for representing sequences. After the segment is inserted in step 228, the corresponding edit descriptor is created in step 230 and the "end edit" function is performed on the target sequence in step 232.

Figure 19:
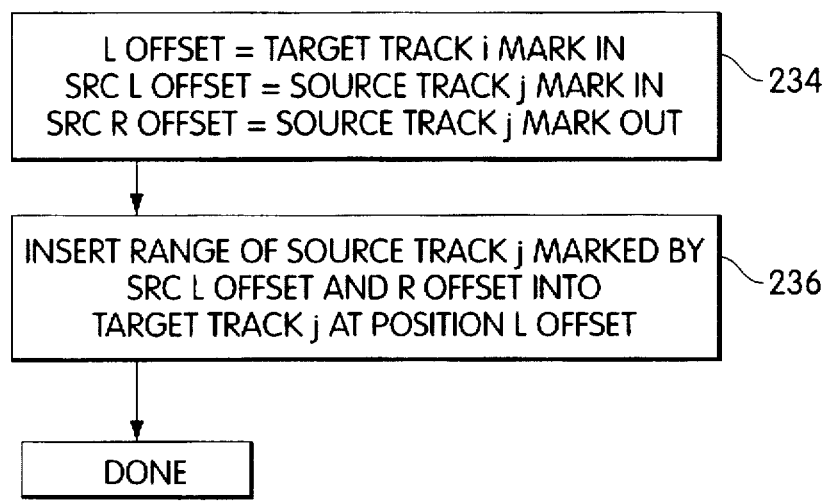
FIG. 19 is a flow chart describing how an insert operation is performed.

The editing operation for inserting material from a source track into a target track will now be described in connection with FIG. 19. The first step of this editing operation is setting the left offset value to the mark-in position of the target track. Source left offset and source right offset values are respectively set to the mark-in and mark-out positions of the source track. The range defined by the source track mark-in and mark-out positions is then inserted into the target track at the position defined by left offset in step 236. This step 236 of inserting a range is described above in connection with FIG. 17.

Figure 20A:
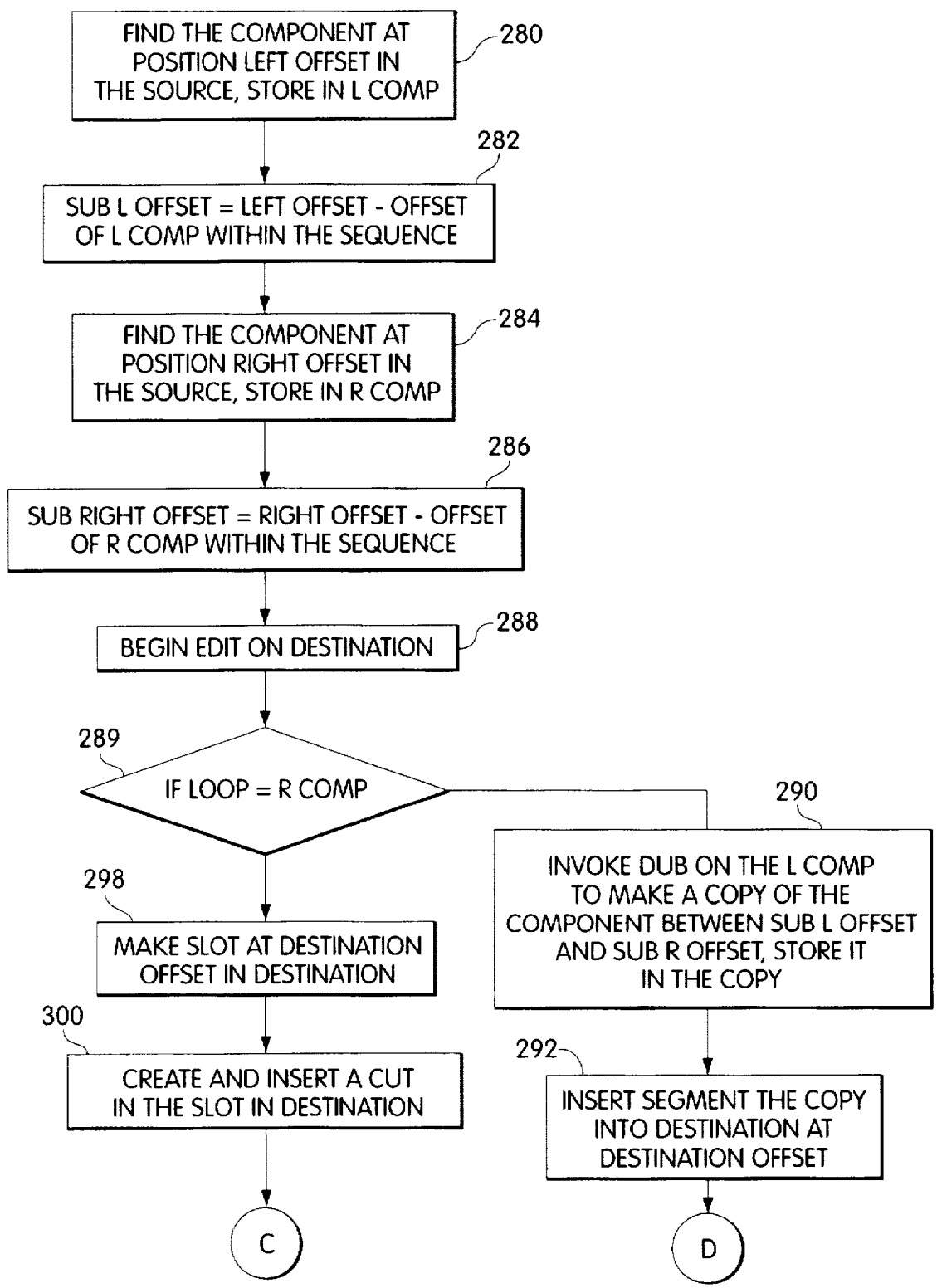
FIGS. 20A–C; are flow charts describing how a subsequence is copied.
Figure 20B:
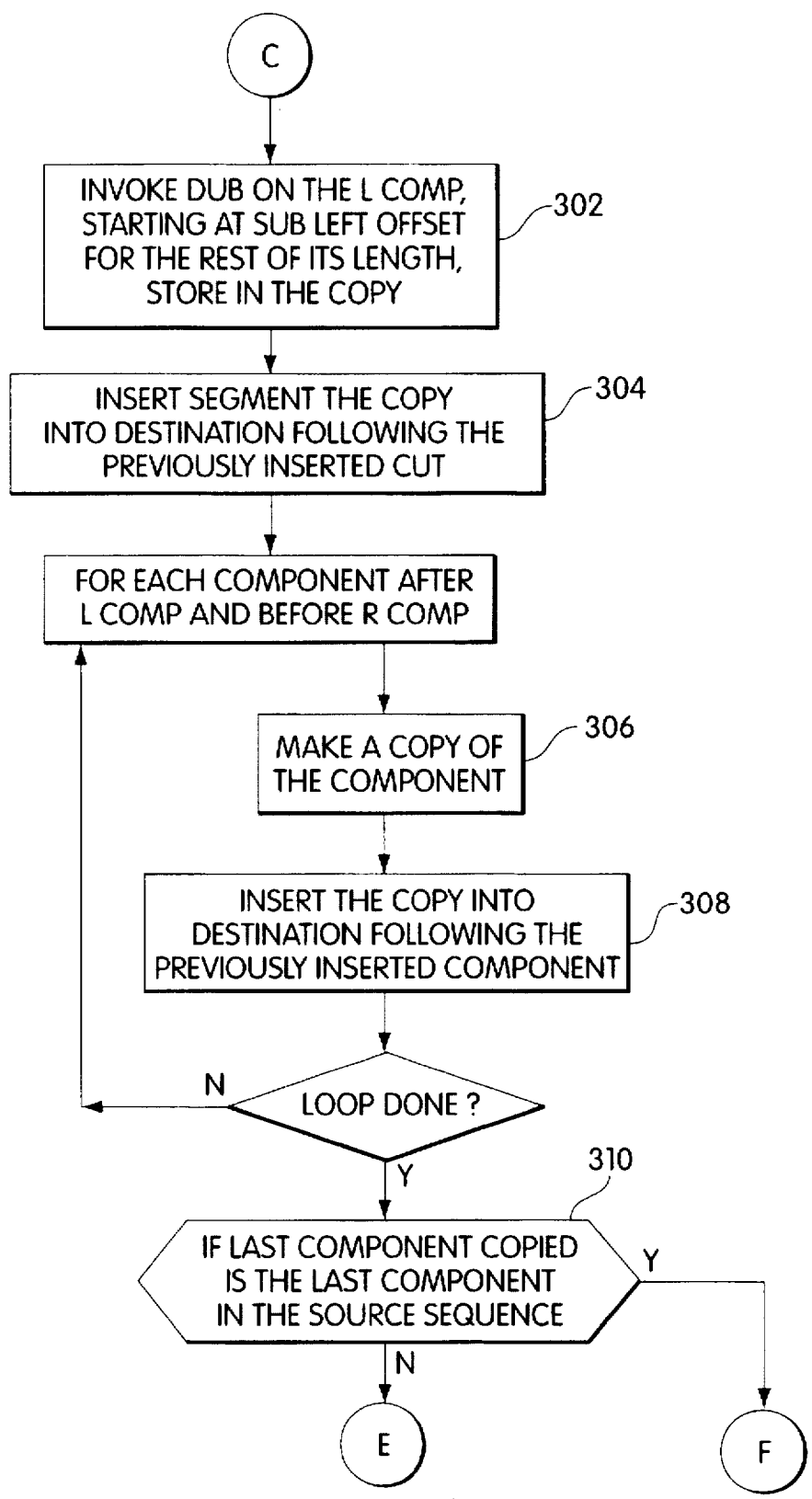
Figure 20C:
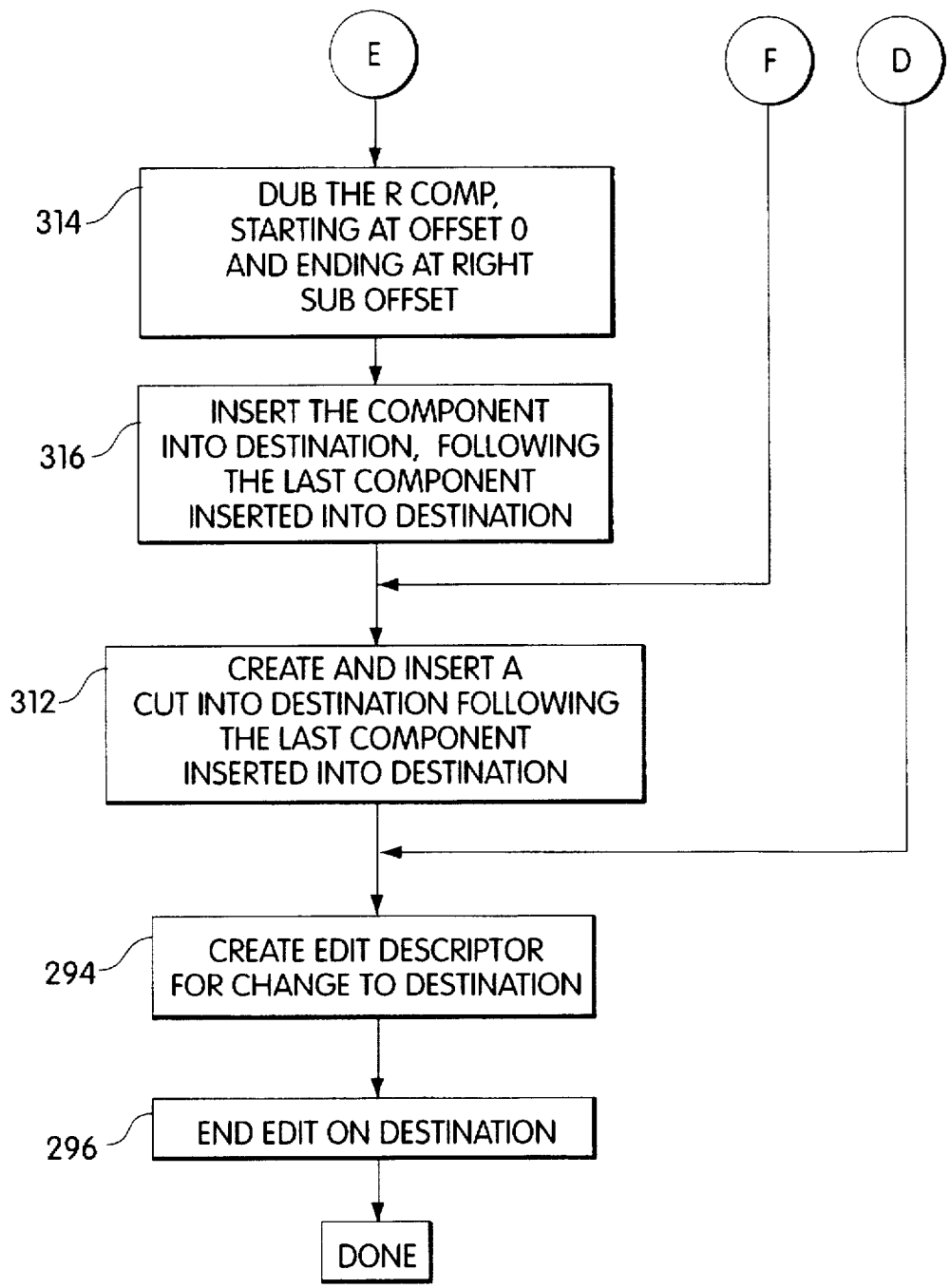

The copying of a sequence, such as for step 214 of FIG. 17, will now be described in connection with FIGS. 20A-20C. The step of copying of a sequence is similar to moving a subsequence, but instead of removing subcomponents from the source, the components are merely copied and the source remains unchanged. Thus, when the offsets for the source fall within a component of the source, a partial copy is made by dubbing, rather than making a slot (which is used in moving the subsequence) in order not to modify the source.

The first step 280 of copying a sequence is finding the component in the source at the position of the left offset. A sub-left offset is then generated in step 282 by subtracting the offset of the beginning of that component within the sequence from the left offset value. Next, a component at the right offset position in the source is found in step 284, and similarly a sub-right offset is obtained in step 286 by subtracting the offset of the beginning of the right component within the sequence from the right offset value. With these components and values determined, the next step is performing the "begin edit" function on the destination sequence (step 288).

If the right component and left component are the same, the left component is dubbed, to make a copy of the component between the sub-left offset values and the sub-right offset values (step 290). This copy is then inserted into the destination sequence at the destination offset in step 292, in a manner as described above in connection with FIG. 18. Next, an edit descriptor is created to describe the change to the destination sequence (step 294 of FIG. 20C) and the "end edit" function is then performed on the destination sequence in step 296.

If the left component and the right component are not the same, as determined in step 289 (FIG. 20A), a slot is made at the destination offset in the destination sequence (step 298) in a manner described below in more detail in connection with FIGS. 21A-B. Next, a cut transition is created and inserted in the slot in the destination sequence in step 300. Next, the left component, starting at the position defined by sub-left offset, is dubbed, to create a copy in step 302. This copy of a partial component is then inserted into the destination sequence following the previously inserted cut (step 304). Then, for each component after the left component which is to be copied and the right component, a copy of the component is made in step 306 and that copy is inserted into the destination sequence following any previously inserted component (step 308).

If the last component inserted is the right most component of the copied sequence, a cut transition is created and inserted into the destination sequence following this last component in step 312. Otherwise, the right component is dubbed, starting at offset 0 and ending at the sub-right offset, in step 314, which copy is then inserted into the destination sequence following the last component previously inserted into the destination sequence in step 316. After the right component has been inserted into the destination sequence, the cut is created in step 312 as described above. When the copy is complete, the edit descriptor is created in step 396 and the end edit function is performed on the destination sequence in step 296.

The process of making a slot in a target sequence, at an offset, for example, as used in step 298 of FIG. 20A, 226 of FIG. 18, 246 of FIG. 16A, will now be described in connection with FIG. 21A-C. The function of making a slot is used to prepare a sequence or subcomponents to be inserted at a position indicated by an offset. In a properly formed sequence, subcomponents are arranged in alternately series of segments and transitions where the first and last components are segments. The segment that is located in the target sequence at the indicated offset is found and split into two segments at the indicated offset. This operation leaves the sequence in a temporarily inconsistent state in which two segments are adjacent to each other without a transition in between. The point between the segments is considered a slot. This slot is a place where a transition component, or an alternating series of transition components and segment components bounded by transition components, can be inserted.

The slot making procedure will now be described in connection with FIGS. 21A-B. The first step 320 of this process is finding the component that falls at or covers the position indicated by the offset where a slot is to be made. The slot sub-offset is then set, in step 322, to be the difference between the offset and offset of the found component within the sequence. If the slot component is the first component, as determined in step 324, the transition directly to the left of the component is then examined in step 326, to determine its right effect length. If the right effect length is determined to be greater than the slot sub-offset, as in step 328, an error is reported.

Many things may be done in response to an error, because it really indicates an undefined request on the part of the editor. That is, it is not known whether the transition effect length should be shortened, or if the same transition should be placed on opposite sides of the slot where something is to be inserted, or if the editor did in fact make a mistake. For the sake of simplicity, the attempted edit may be aborted, and to revert the composition back to its original state before editing.

If the transition to the left of the component, if any, is not affected by the slot making procedure, the process continues with step 330 of determining whether the slot component is the last component of the sequence in which the slot is made. If it is not the last component, the transition to the right of the component is examined in steps 332 and 334 to determine if its left effect length is greater than the length of the slot component minus the slot sub-offset. As above in step 328, if the adjacent transition is affected by the slot, an error is reported. If the transition is not affected, or if the component is the last component in the sequence, the process continues through step 336 of splitting the component at the position indicated by the slot sub-offset to break off a new component either from the left or the right of the given component.

If the new component is generated on the left, as determined in step 338 based on information provided from the splitting of the component, the new component is inserted to the left of the slot component in step 340, otherwise it is inserted to the right of the slot component in step 342. The insertion is performed according to the insert component procedure described above in connection with FIG. 5. After the new component is inserted, the value of the original component, indicating its duration, and the tree corresponding to the sequence in which the component is found, is shortened to reflect the shortened length. The original slot component remains in the sequence, but its size is merely changed because a piece has been broken off by the split operation in step 336. The split operation will be described in more detail below in connection with FIGS. 26A–C.

The editing operation of extracting material from a target sequence will now be described in connection with FIG. 22. The first step 400 of this process is creating a new empty sequence. The subsequence indicated by the left and right offsets, as determined by the mark-in and mark-out positions, is then moved into the created new sequence at offset 0 (step 402). This step is performed using the process described above in connection with FIG. 16A–16C. The extracted sequence is then returned, for example, by returning a pointer to its location at memory, in step 404.

The editing operation for lifting a sequence from a target sequence will now be described in connection with FIG. 23. The first step of this process is performing the "begin edit" function in step 406. The material as indicated by the mark-in and mark-out positions on the target sequence, i.e. the left and right offsets, is extracted, using the process described above in connection with FIG. 22. A filler object is then created in step 408, having as its length, the length of the removed sequence. The filler is then inserted, in step 412, using the process for inserting a segment as described above in connection with FIG. 18. An edit descriptor is then created in step 414 and the end edit function is performed in step 416. The lifted material is then returned, in step 418, for example by providing a pointer to its location in memory.

Figure 22:
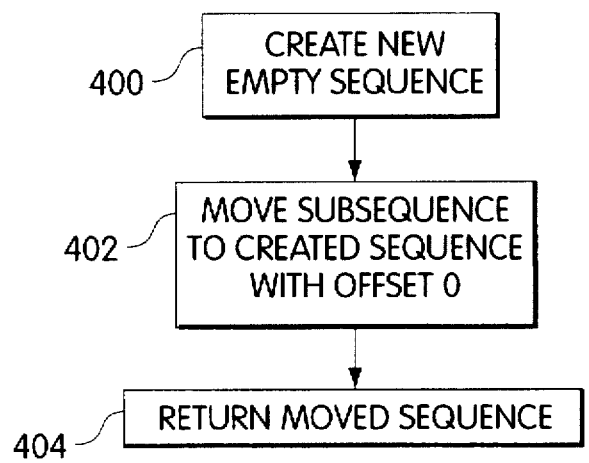
FIG. 22 is a flow chart describing how an extract operation is performed.
Figure 23:
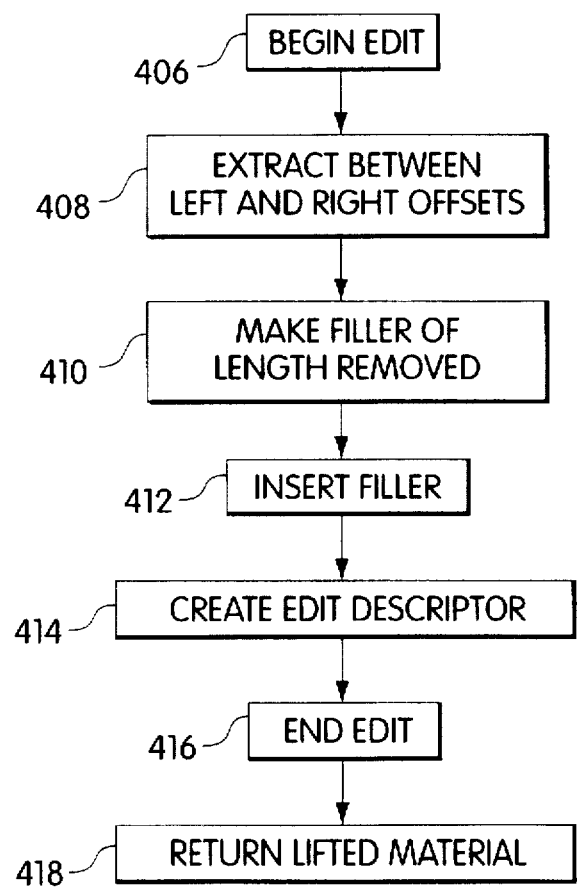
FIG. 23 is a flow chart describing how a lift operation is performed.

If a delete operation is to be implemented, i.e., one which does not save the extracted material, it may be implemented by modifying the extraction procedure of FIG. 22 to eliminate the creation and return steps 400 and 404, and by moving the extracted subsequence to a null destination.

Figure 24:
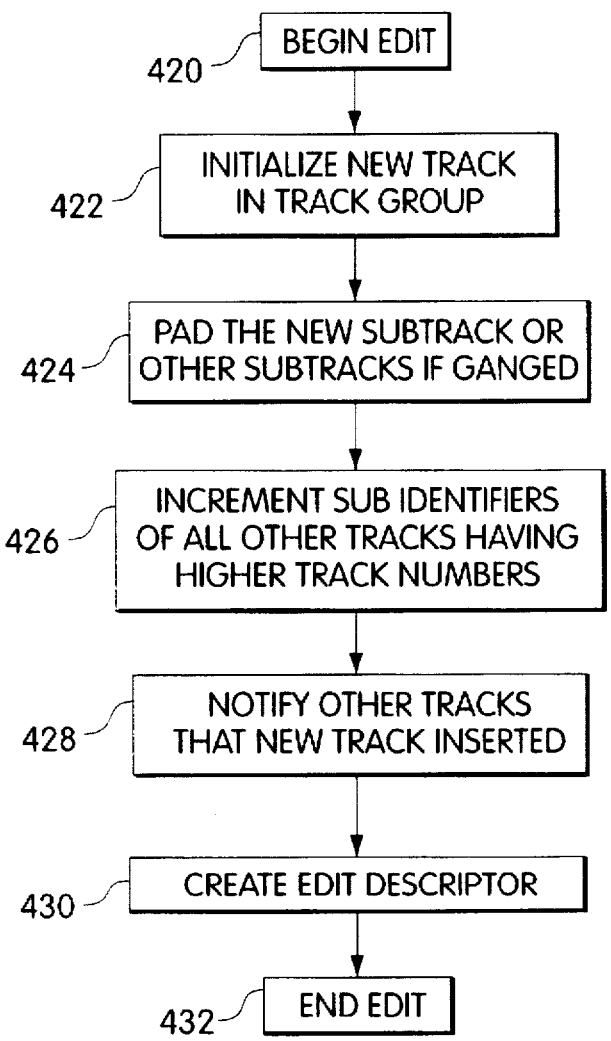
FIG. 24 is a flow chart describing how a track is added to a track group.

FIG. 24 describes another editing function for adding a track to a track group. The first step of this process is performing the "begin edit" function in step 420. The new track is initialized in the track group in step 422, by creating a new track object, and initializing its stored values. The track is given a user selected track number according the selected insert position in the track group. The initialized track information is stored in the list of tracks for the track group, and the component for the track stores its track number and an identifier to the track group as its parent.

If the track group is ganged, the tracks are kept the same length by adding or removing filler. The addition or removal of filler may be performed in a manner as described above for replacing or inserting a component. Next, in step 426, the subidentifiers, or track numbers, of other tracks in the track group having a track number are originally equal to or higher than the inserted track number, or incremented. Then other tracks other than the newly inserted tracks are notified of this insertion in step 428. The process for notification is the same as the notification of a track change, as described above in connection with FIG. 11. Next, an edit descriptor is created in step 430, which indicates the difference in length of the track. The "end edit" function is then performed in step 432.

Figure 25:
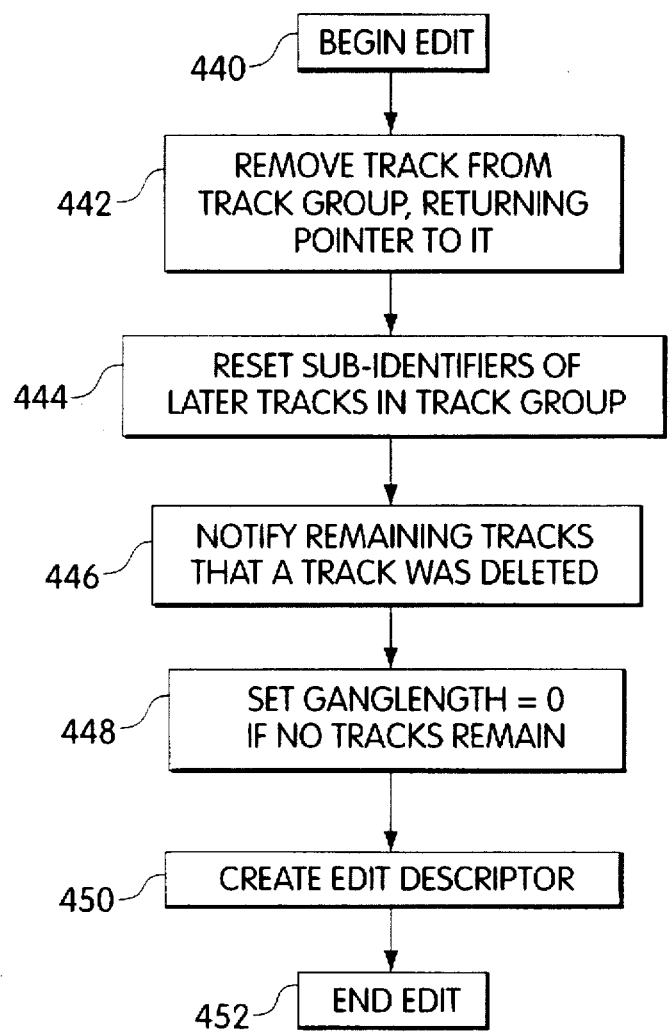
FIG. 25 is a flow chart describing how a track is removed from a track group.

The removal of a track will now be described in connection with FIG. 25. This process begins with step 440 of performing the "begin edit" function on the track to be removed. Next, the track is removed from the track group, by deleting its information from the track group array, or list, and by setting its parent and subidentifier values to no, or similar nonrepresentative values. When the track is removed in step 442, a pointer is returned to the track, enabling its use by an editor for other compositions. The subidentifiers for other tracks having higher track numbers in the track group are then decremented in step 444. The remaining tracks are then notified in step 446 that a track has been deleted. This step is performed in the same manner as the notified track change described above in connection with FIG. 11.

If no tracks remain in the track group, the track group's gang length is then set to 0 in step 448. The track removal process is completed then with the steps 450 and 452 respectively of creating an edit descriptor and performing the "end edit" function on the track.

Figure 26A:
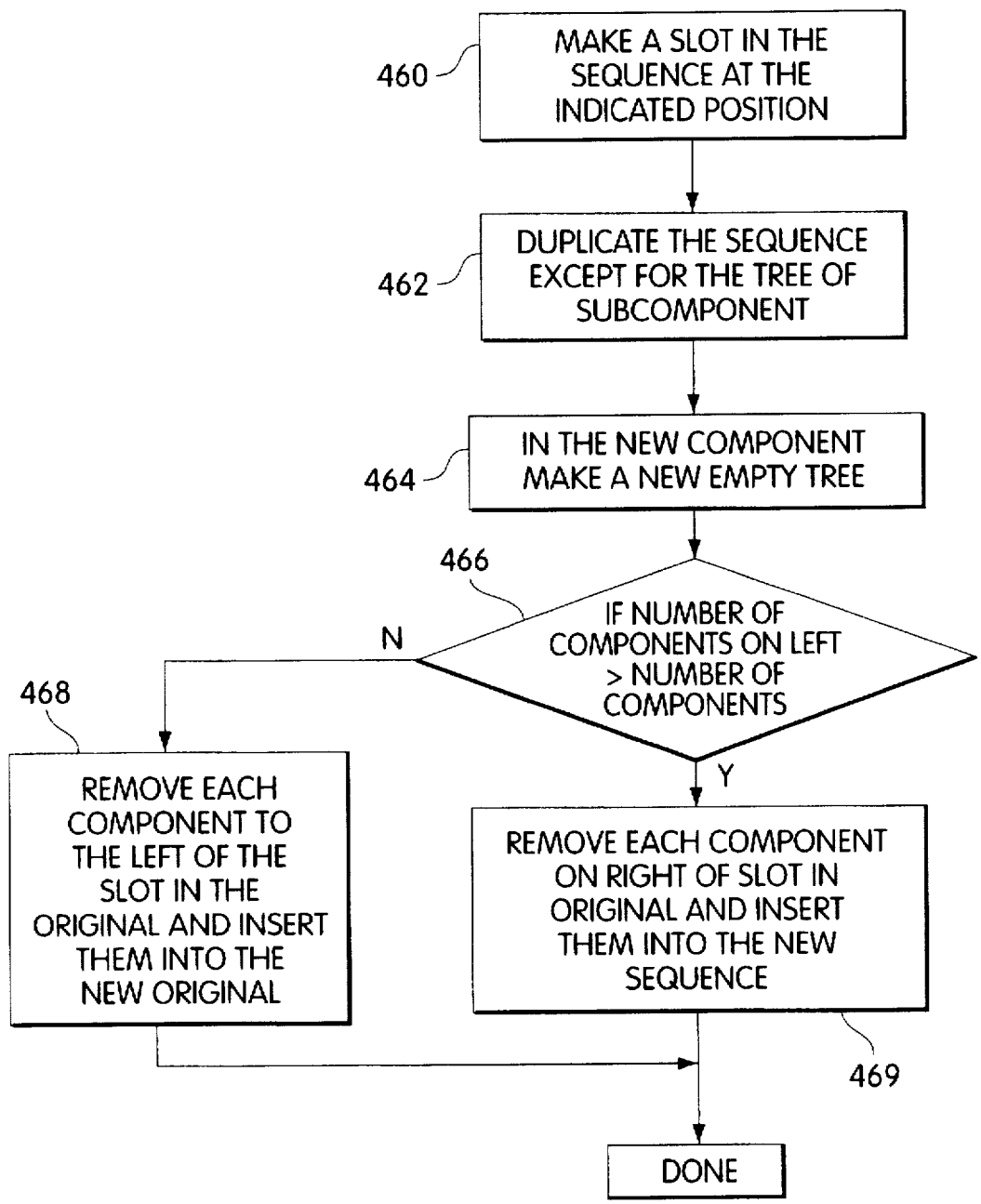
FIGS. 26A–C are flow charts describing how a component is split.
Figure 26B:
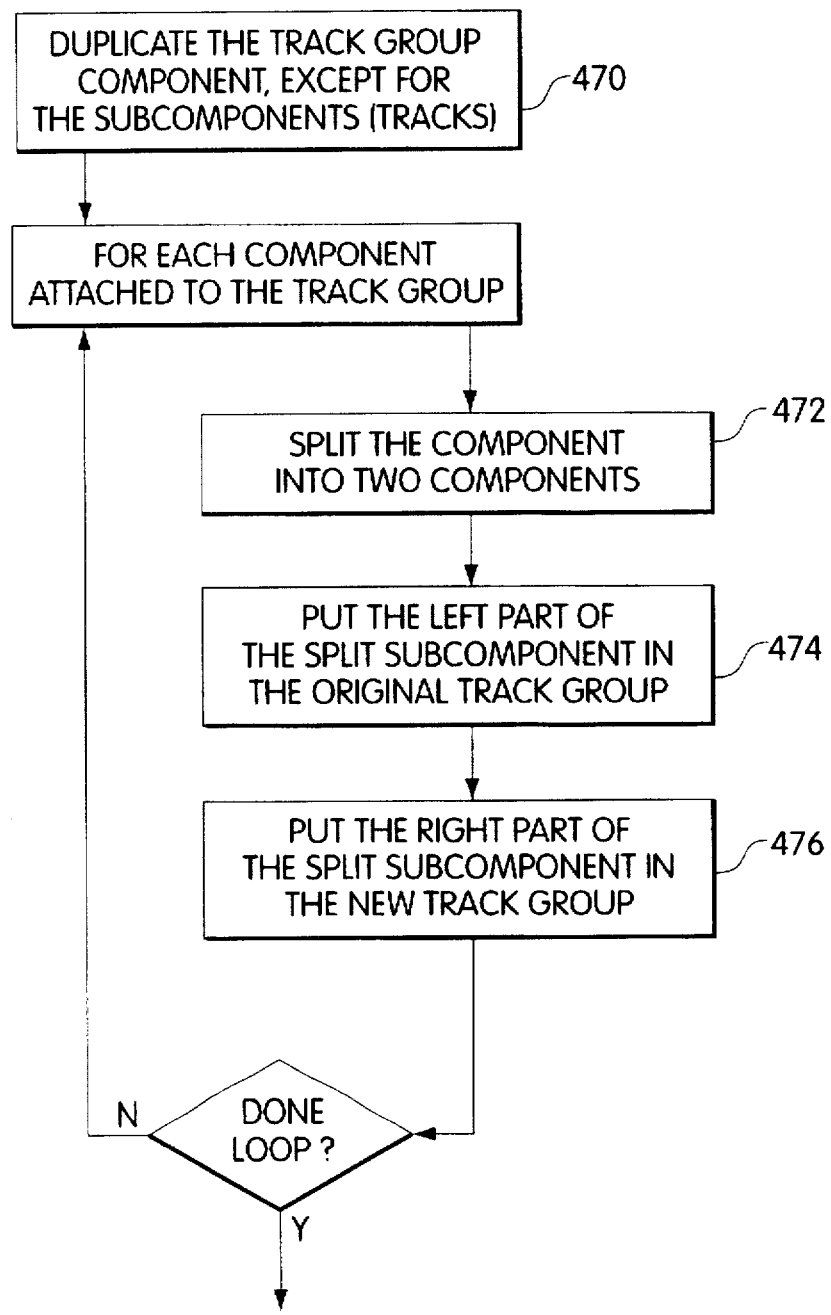
Figure 26C:
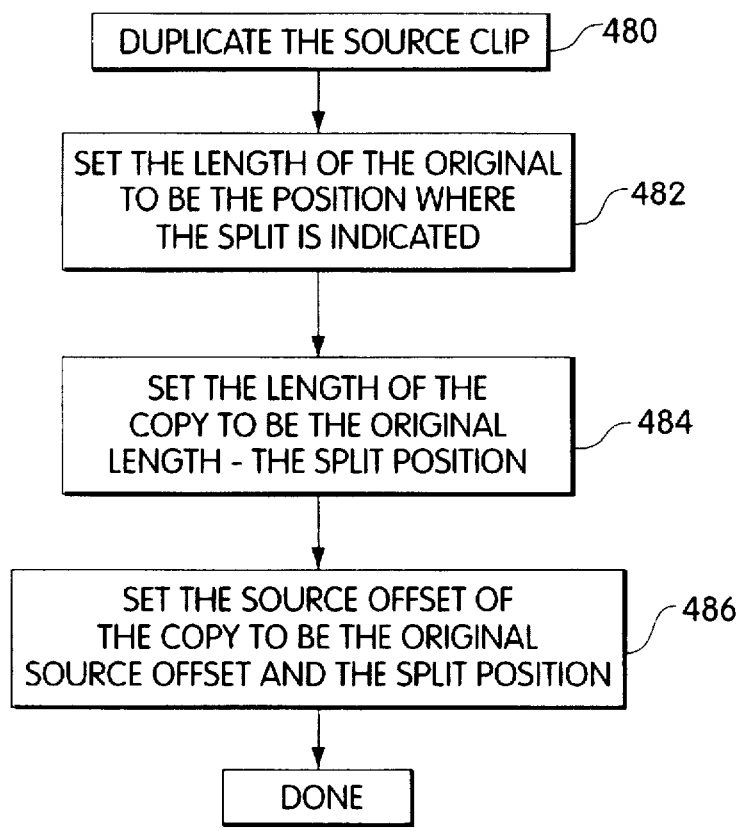

The primitive operations of split, trim, dub and trim transition will now be described in connection with FIGS. 26 through 29. The operation of split is shown in FIGS. 26A through 26C, as it may be performed on different components.

A split is a recursive function that operates on a component. Every type of component implements a split function. When split is applied to a component at a specified position, the component modifies its own structure into one that represents the material on one side of the indicated position, and creates a new component representing the other side. The choice of which side (left or right of the position) is to be the new component is made dynamically based on performance considerations. That is, the shorter part of the component, which requires less copying, is moved to the new component.

The operation of split on a sequence component, given a specified position will now be described in connection with FIG. 26A. The first step 460 of splitting a sequence is making a slot in a sequence at the position indicated. The sequence component is duplicated except for its tree of subcomponents in step 462 and in the new component a new empty tree is created in step 464. Next, it is determined in step 466 whether the number of components on the left of the slot is greater than the number of components on the right of the slot. For the side which has fewer components, each component on that side is removed from the original sequence and inserted into the newly created sequence, preserving the order of the subcomponents (steps 468 or 469).

Splitting a track group will now be described in connection with the flow chart of FIG. 26B. Splitting of a track group involves recursively splitting all of its subcomponents representing its tracks, and placing the new components into a new track group. The first step of this operation is duplicating the track group component except for its pointers to subcomponents step 470. For each subcomponent attached to the track group, the component is split into two components in step 472. The left part of the split subcomponent is placed in the original track group in step 474, while the right part of the split component is put in the new track group in step 476. When this loop has been completed for each subcomponent, splitting of a track group is complete.

Splitting of a source clip will now be described in connection with FIG. 26C. Since source clips have no subcomponents, splitting them is relatively simple. The first step is duplicating the source clip in step 480. The length of the original is set to be the position where the split is indicated in step 482. The length of the copy is set to be the original length minus the split position in step 484. The source offset of the copy is then set to be the original source offset plus with split position in step 486.

Figure 27A:
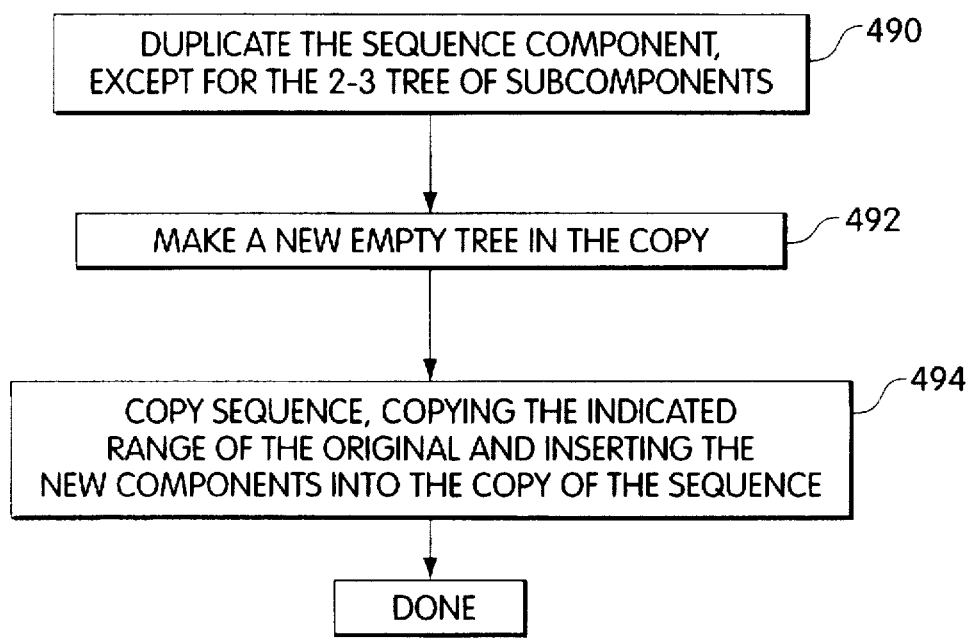
FIGS. 27A–B are flow charts describing how a component is dubbed.
Figure 27B:
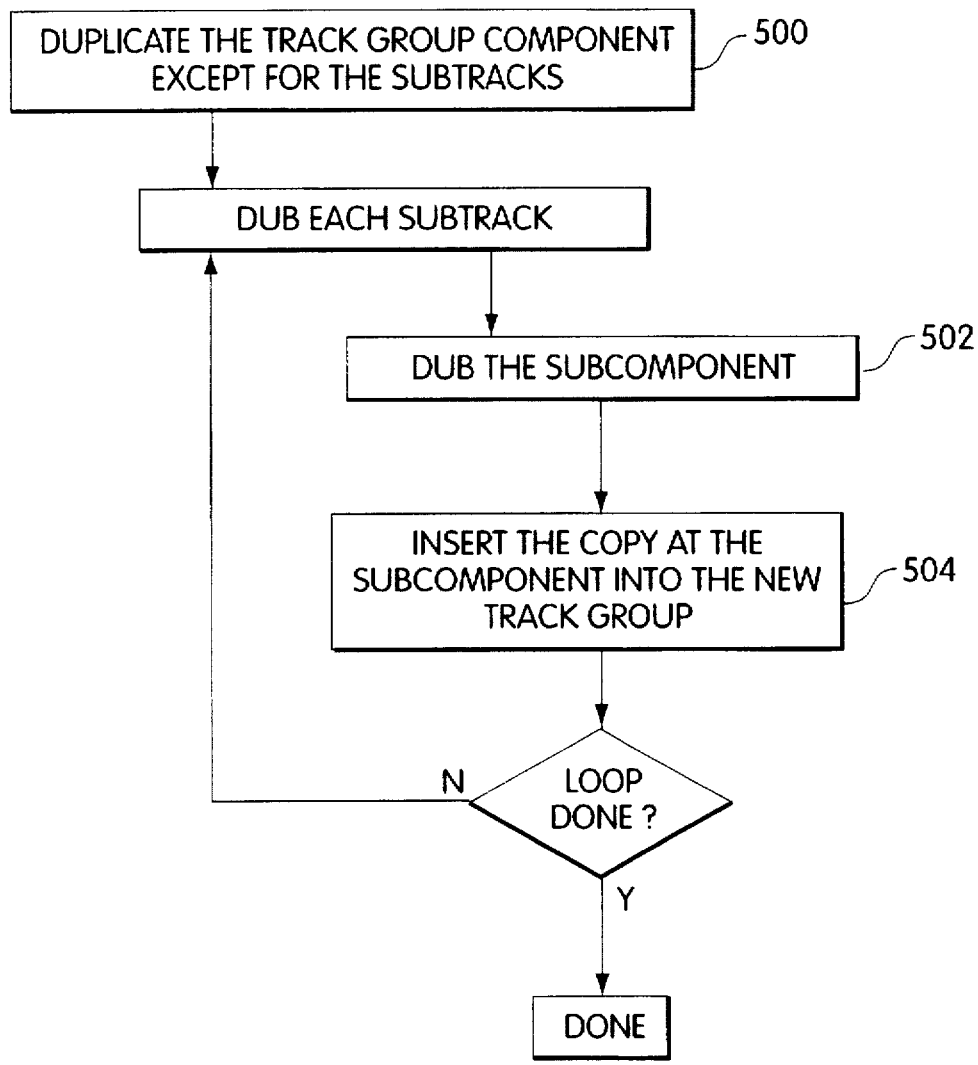

Dubbing of a segment will now be described in connection with FIGS. 27A through 27C. Dub is a recursive function on a component and its subcomponents. Given a component, a left offset and a right offset, dubbing makes a new component of the same type, representing the material between those offsets. Dub may be implemented for all components but its details may vary by component type.

Dubbing of a sequence will now be described in connection with FIG. 27A. The first step is duplicating the sequence component as indicated by the left and right offset, except for its tree of subcomponents. A new empty tree is made in the copy in step 492. The indicated range of the original is then copied, using copy subsequence, as described above, and a copy of the new component is inserted into the copy of the sequence (step 494).

Dubbing of a track group will now be described in connection with the flow chart of FIG. 27B. The first step is duplicating the track group component except for its subtracks 500. For each subtrack, the subcomponent is dubbed in step 402 and the copy of the subcomponent is inserted into the new track group in step 504. Dubbing of a track group is completed when dubbing of each subtrack is complete.

Dubbing of a source clip is relatively simple, as it involves merely creating a new source clip as a duplicate of the original source clip component.

Figure 28A:
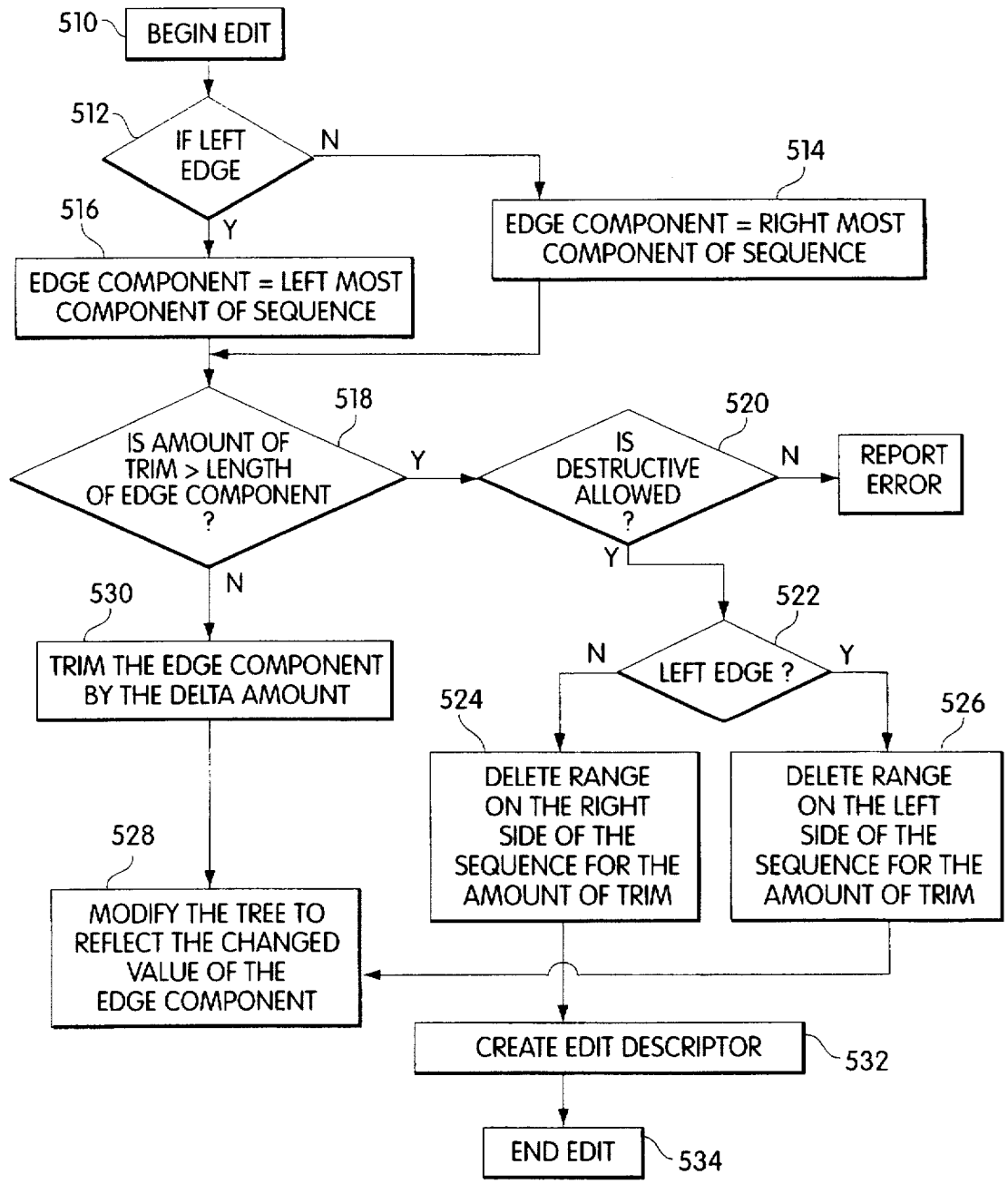
FIGS. 28A–C are flow charts describing how a component is trimmed.
Figure 28B:
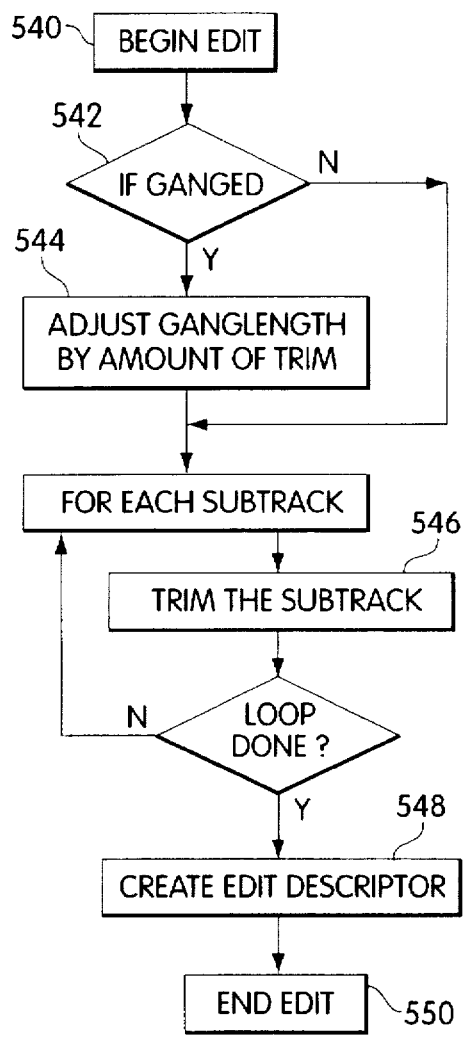
Figure 28C:
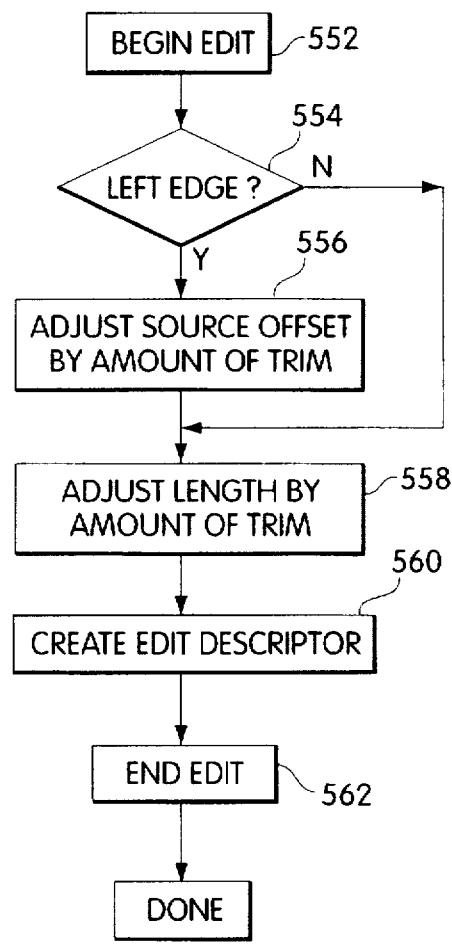

The trim operation will now be described in connection with FIGS. 28A through 28C. Trim is an operation which modifies the edges of any component. It recursively operates on the subcomponents of a component. Given a flag indicating the left edge or the right edge of a component, a value "delta" indicating the change and position of that edge, and a flag indicating whether destruction trimming is allowed, a trim is performed. Destructive trimming is a trim which at some level of the composition will cause a component to be deleted.

Trimming a sequence will now be described in connection with FIG. 28A. The first step is performing the begin edit function on the sequence 510. If the left edge is to be trimmed, a variable "edge component" is set to be the rightmost component of the sequence, otherwise the variable is set to be the leftmost component of the sequence. If the amount of trim is greater than the length of the edge component, as determined in step 518, and if destructive trimming is not allowed, as determined in step 520, an error is reported. If destructive trimming is allowed, the function "delete range" is performed (steps 524 and 526), for the edge of the component to be trimmed, which is determined in step 522.

If the amount of trim is less than the length of the edge component, the edge component is trimmed by the amount "delta" as mentioned above in step 530. After the edge component is trimmed in step 530, the tree of the sequence is modified to reflect the change value of the edge component.

After a range is deleted, or a component is trimmed, this procedure terminates by creating an appropriate edit descriptor and by performing the "end edit" function.

Trimming of a track group will now be described in connection with FIG. 28B. The first step 540 of trimming a track group is performing the begin edit function on the track group. If the track group is ganged, as determined in step 542, the gang length is adjusted by the amount of trim in step 544. After the gang length is adjusted, if necessary, for each subtrack in the track group, the subtrack is trimmed in step 546. When all of the subtracks have been trimmed, an edit descriptor is created in step 548 and the end edit function is performed in step 550.

Trimming of a source clip will now be described in connection with FIG. 28C. The first step 552 of this operation is performing the begin edit function. If the left edge of the source is to be trimmed, the source offset is adjusted by the amount of trim in step 556. After any adjustment to the source offset, the length of the source clip is adjusted by the amount of trim in step 558. An edit descriptor is then created in step 560 and the end edit function is performed in step 562.

Figure 29:
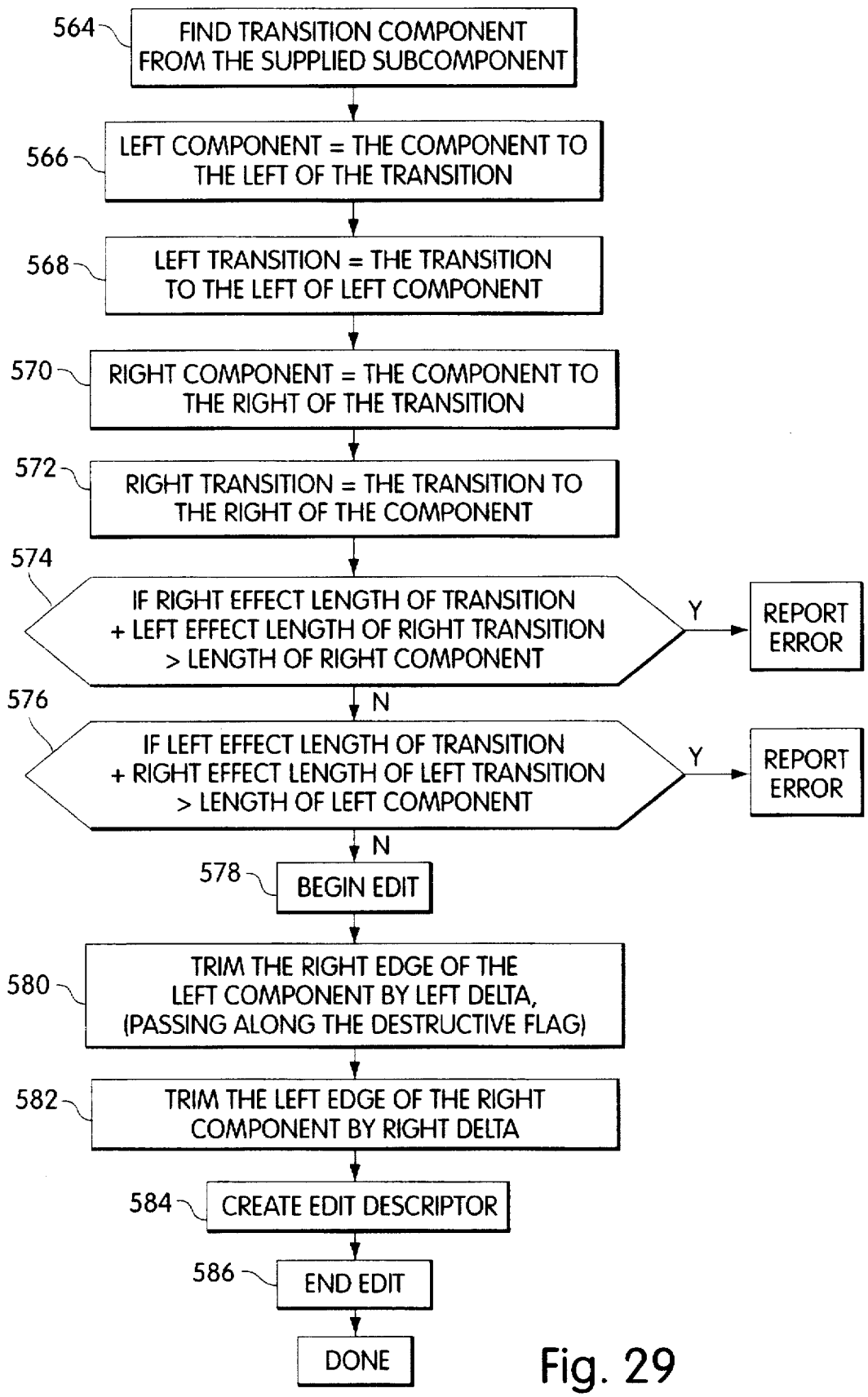
FIG. 29 is a flow chart describing how a transition is trimmed.

The process of trimming a transition will now be described in connection with FIG. 29. This operation uses the subcomponent identifier of a transition within a sequence, a left delta indicating how much to trim the component on the left of the transition, a right delta indicating how much to trim the component on the right and a flag indicating whether destruction of subcomponents is allowed. The first step 570 of trimming a transition is finding the transition component from the supplied subcomponent identifier in step 564. A variable "left component" is then set to be the component to the left of the transition. The left transition is the transition to the left of the left component (568). Similarly, the right component and right transition are set in steps 570 and 572 to be the component to the right of the transition and the transition to the right of the right component.

If the sum of the right effect length of the transition and the left effect length of the right transition is greater than the length of the right component, an error is reported (step 574). If the sum of the left effect length of the transition in the right effect length of the left transition is greater than the length of the left component, it is determined in step 576, and another error is reported.

The next step 578 of trimming a transition is performing the "begin edit" function on the transition. The right edge of the left component is then trimmed by the left delta value in step 580. The flag indicating whether destruction of subcomponents is allowed is passed to this trim function. Next, in step 582, the left edge of the right component is trimmed by the right delta value. Finally, the trimming of transition is completed by steps 584 of creating the edit descriptor and 586 of performing the end edit function on this transition.

Figure 30:
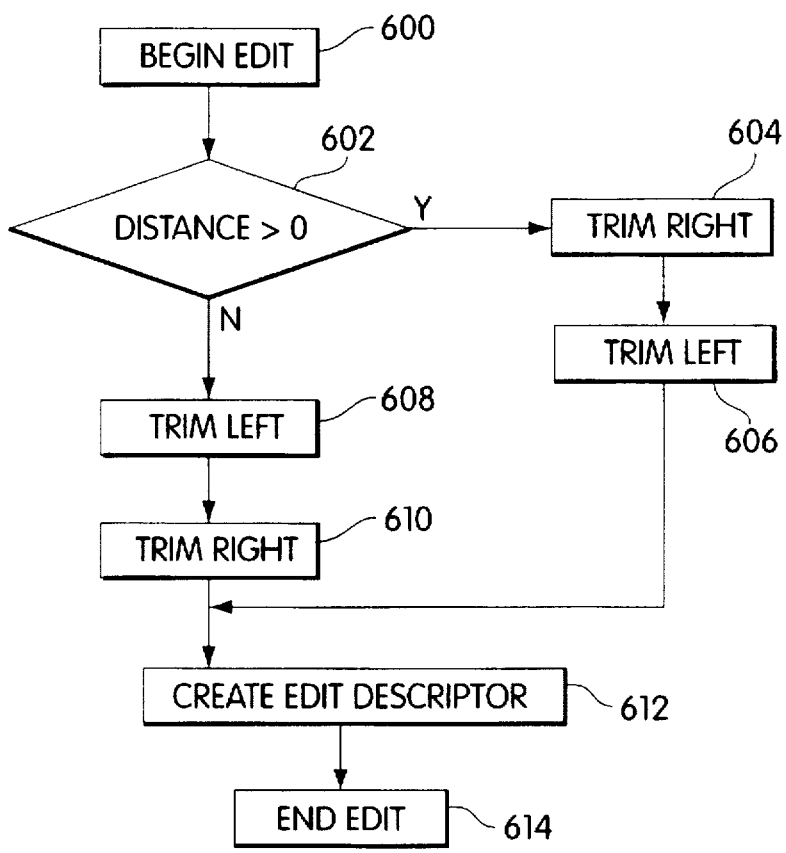
FIG. 30 is a flow chart describing the roll and slide editing operations.

The procedures for performing slide and roll operations will now be described in connection with FIG. 30. The initialization procedures for both the slide and roll, wherein the user selects a target track and mark-in and mark-out position is similar to those described above in connection with FIG. 6 and the extract and lift functions. The main differences with these functions is that they also take a direction and an amount in that direction. Such an indication can be provided by a variety of user device inputs, such as by dragging a mouse cursor or by depressing a key for a fixed amount of time on a keyboard.

The mark-in and mark-out positions are actually used to determine the identifiers of the transitions, as the transitions stay in place and are not moved. The first step of a roll is performing the "begin edit" function in step 600. If the distance or duration of the roll is greater than 0 or positive, as determined in step 602, the right side transition is trimmed first in step 604 and then the left side is trimmed in step 606. This insures that the rolled sequence gets longer before it gets shorter, so the edges do not run into each other. Otherwise, if the distance is negative, the left transition is trimmed first in step 608, then the right in step 610. After the appropriate trims are performed, the edit description is created in step 612 and the end edit function is performed in step 614. The edit descriptor includes the left bound as the offset of the left transition and the right bound as the offset of the right transition. The offset of synchronization begins at an offset of 0 from the left bound, and the amount of the shift is the distance of the roll.

A slide is similar to a roll, although it uses different trimming operations on the left and right sides as described above. However, the order of the trim operations for positive and negative distance values may be arbitrary. The edit descriptor for a slide is also different. The left bound value is the minimum of the position of the transition and the sum of this position and the distance of the slide. Similarly, the right bound is the maximum of the position of the right transition and the sum of the right transition and the distance of the slide. The offset of any time shift is 0, and the amount of the time shift is the distance of the slide.

By implementing the above-described functions, a comprehensive editing system using a representation in accordance with the invention may be implemented. It should be understood that these functions may be implemented in a variety of different ways and that more or less functions may be provided, as desired or needed.

There are a variety of ways in which a composition in accordance with this invention may further be used to present the information it contains. It may be played back, in order to be viewed by a person, such as its editor. An edit decision list may be created in order to control the original data sources to produce the final presentation or another video tape. Finally each frame may be randomly accessed for editing or viewing.

Having now described an embodiment of the present invention, it should be understood that the foregoing is merely illustrative, having been presented by way of example only. Numerous modifications may be made to the embodiments shown, and such modifications are considered to be within the scope of the invention as defined by the following claims and equivalents thereto.

What is claimed is:

1. A computer-readable medium having computer-readable logic stored therein defining a data structure for representing a multimedia composition using recursively defined instances of components of a plurality of kinds and for access by an application program being executed on a data processing system, wherein a first kind of component defines a sequence of instances of components of any kind to be displayed continuously and sequentially, wherein a second kind of component defines a source of media data defined by a plurality of samples at a temporal sampling resolution, and wherein a third kind of component defines a group of instances of components of any kind to be displayed concurrently, the data structure, comprising:

means for defining the multimedia composition as a group of concurrent components using the third kind of component;

means for defining one of the concurrent components as a sequence of components using the first kind of component;

means for defining one of the components in the sequence of components using the first kind of component;

means for defining another one of the components in the sequence of components using the second kind of component; and means for defining a different one of the components in the sequence of components using the third kind of component.

2. The computer-readable medium of claim 1, wherein the reference to the source of media data is a reference to another multimedia composition.

3. The computer-readable medium of claim 1, wherein the multimedia composition is a motion video program.

4. An object oriented system for representing a multimedia program for implementation on a computer in an object-oriented framework, comprising:

(a) an abstract component class;

(b) a track group class derived from the abstract component class and defining a first subclass of the component class, wherein a track group object, an instance of the track group class, comprises:
 a collection of objects in the component class; and
 a display method for displaying the collection of component objects concurrently;

(c) a sequence class derived from the abstract component class and defining a second subclass of the component class, wherein a sequence object, an instance of the sequence class, comprises:
 a collection of objects in the component class; and
 a display method for displaying the collection of component objects continuously and sequentially; and (d) a source clip class derived from the abstract component class and defining a third subclass of the abstract component class, wherein a source clip object, an instance of the source clip class, comprises:
 an indication of a source of media data; and
 a display method for accessing the media data from the source and for displaying the media data.

5. The object-oriented system of claim 4, further comprising a composition class derived from the track group class, wherein a composition object, an instance of the composition class, comprises:

a collection of objects in the sequence class; and a display method for displaying the collection of objects concurrently;

wherein the multimedia program represented by the object-oriented system is defined by the instance of the composition class.

6. The object-oriented system of claim 5, wherein the indication of the source of media data of a source clip object is an indication of a composition object.

7. The object-oriented system of claim 4, wherein the track group class, the sequence class and the source clip class are subclasses of an abstract segment class derived from the abstract component class, and wherein the sequence object comprises a collection of objects in the segment class; and further comprising:
a transition class derived from the abstract component class, wherein a transition object, an instance of the transition class, comprises:
 an indication of a kind of transition, an indication of a portion of a first segment, and an indication of a portion of a second segment, wherein the first and second segments are segment objects in the collection of objects in a sequence object.

8. A computer system for editing a multimedia composition, comprising:

means for permitting an editor to create an instance of a track group object in a first subclass of a component object class including a collection of references to objects in the component object class, wherein the objects in the collection of references are displayed concurrently;

means for permitting an editor to create an instance of a sequence object in a second subclass of the component object class including a collection of references to objects in the component object class, wherein the objects in the collection of references are displayed sequentially and continuously;

means for permitting an editor to create an instance of a clip object in a third subclass of the component object class including a reference to a source of media data; and means for permitting a user to complete the references to objects in the component object class in instances of track group objects and sequence objects using references to instances of track group objects, sequence objects and clip objects.

* * * * *